US012596408B2

(12) United States Patent
Sung

(10) Patent No.: US 12,596,408 B2
(45) Date of Patent: Apr. 7, 2026

(54) DISPLAY DEVICE AND METHOD FOR MANUFACTURING THE SAME

(71) Applicant: SAMSUNG DISPLAY CO., LTD., Yongin-si (KR)

(72) Inventor: Sujin Sung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 194 days.

(21) Appl. No.: 18/472,795

(22) Filed: Sep. 22, 2023

(65) Prior Publication Data

US 2024/0211001 A1     Jun. 27, 2024

(30) Foreign Application Priority Data

Dec. 22, 2022     (KR) ........................ 10-2022-0181214

(51) Int. Cl.
*G06F 1/16* (2006.01)

(52) U.S. Cl.
CPC .......... *G06F 1/1656* (2013.01); *G06F 1/1652* (2013.01)

(58) Field of Classification Search
CPC .... G06F 1/1656; G06F 1/1652; G06F 3/0412; G09F 9/301; G09F 9/33; G09F 9/335; H10K 59/1201; H10K 59/40; H10K 59/873; H10K 59/875; H10K 71/00; H10K 50/841; H10K 50/86; H10K 2102/311
See application file for complete search history.

(56) References Cited

U.S. PATENT DOCUMENTS

| | | | |
|---|---|---|---|
| 2013/0215067 A1* | 8/2013 | Hwang | G06F 3/0443 |
| | | | 345/173 |
| 2015/0064367 A1* | 3/2015 | Choi | G02B 5/3041 |
| | | | 428/1.31 |
| 2017/0205541 A1* | 7/2017 | Amin | G02B 5/021 |
| 2018/0352668 A1* | 12/2018 | Amin | B24C 1/00 |
| 2021/0257582 A1 | 8/2021 | Kim et al. | |
| 2022/0107448 A1 | 4/2022 | Kim et al. | |
| 2022/0128738 A1 | 4/2022 | Tada et al. | |

FOREIGN PATENT DOCUMENTS

| | | | | |
|---|---|---|---|---|
| EP | | 3907581 A1 * | 11/2021 | H04M 1/0268 |
| KR | 10-2021-0104514 | | 8/2021 | |
| KR | 10-2021-0147121 | | 12/2021 | |
| KR | 10-2022-0046050 | | 4/2022 | |
| WO | 2020129558 | | 6/2020 | |

* cited by examiner

*Primary Examiner* — Nathan L Van Sell

(74) *Attorney, Agent, or Firm* — F. CHAU & ASSOCIATES, LLC

(57) ABSTRACT

A display device includes a display module, a window disposed on the display module, and a protective layer disposed on the window. The protective layer includes a coating layer, an anti-fingerprint pattern layer disposed on a first part of the coating layer, and a lower-reflection pattern layer disposed on a second portion of the coating layer.

20 Claims, 15 Drawing Sheets

DISPLAY DEVICE AND METHOD FOR MANUFACTURING THE SAME

CROSS-REFERENCE TO RELATED APPLICATIONS

This application claims priority under 35 U.S.C. § 119 to Korean Patent Application No. 10-2022-0181214 filed on Dec. 22, 2022, in the Korean Intellectual Property Office, the disclosures of which are incorporated by reference herein in their entireties.

BACKGROUND

Embodiments of the present disclosure provide a display device and a method of manufacturing the same.

A display device is used for various multimedia devices, such as a television, a cellular phone, a tablet computer, and a game machine, to provide image information to a user. Recently, various types of flexible display devices to be foldable or bendable have been developed. The flexible display device has portability because the flexible display device may be changed to be in various shapes, such as being folded, rolled, or bent.

The flexible display device may include a protective layer disposed on a display module and a window which is foldable or bendable. However, the protective layer of the flexible display device may be easily deformed due to a folding operation or a bending operation, or may be easily broken due to an external impact.

SUMMARY

Embodiments of the present disclosure provide a display device capable of preventing a protective layer from being deformed and broken, and a method of manufacturing the same.

According to an embodiment, a display device includes a display module, a window disposed on the display module, and a protective layer disposed on the window. The protective layer includes a coating layer, an anti-fingerprint pattern layer disposed on a first part of the coating layer, and a lower-reflection pattern layer disposed on a second portion of the coating layer.

The anti-fingerprint pattern layer includes a plurality of first patterns extending in a first direction. The lower-reflection pattern layer includes a plurality of second patterns extending in the first direction. Each of the plurality of first patterns and each of the plurality of second patterns are alternately arranged in a second direction different from the first direction.

Each of the plurality of first patterns has a first width in the second direction, each of the plurality of second patterns has a second width in the second direction, and the second width is equal to the first width.

Each of the plurality of first patterns contacts sidewalls of two corresponding second patterns of the plurality of second patterns.

A distance, in the second direction, between a center of one of the plurality of first patterns and a center of one of the plurality of second patterns is about 20 μm or less. The one of the plurality of first patterns contacts the one of the plurality of second patterns.

The protective layer may further include an anti-fingerprint layer disposed on the anti-fingerprint pattern layer and the lower-reflection pattern layer.

The anti-fingerprint layer overlaps the lower-reflection pattern layer and the anti-fingerprint pattern layer, and may be formed integrally with the anti-fingerprint pattern layer.

The protective layer may further include a base layer disposed under the coating layer.

The protective layer may include a folding region folded about a virtual folding axis and a non-folding region, which is not folded about the virtual folding axis.

According to an embodiment of the present disclosure, a display device may include: a display module including, a folding region folded about a virtual folding axis and a non-folding region, which is not folded about the virtual folding axis, a window disposed on the display module, and a protective layer disposed on the window. The protective layer may include a coating layer, a lower-reflection pattern layer disposed on the coating layer, and an anti-fingerprint pattern layer disposed on the lower-reflection pattern layer. The anti-fingerprint pattern layer may include a first pattern disposed on the first portion of the coating layer, and the lower-reflection pattern layer may include a second pattern disposed on a second portion of the coating layer.

The first pattern and the second pattern may have the same width.

The first pattern is provided in plural, the second pattern is provided in plural, and each of the plurality of second patterns and each of the plurality of first patterns are alternately arranged.

Each of the plurality of first patterns and each of the plurality of second patterns alternately contact with each other.

A distance between a center of one of the plurality of first patterns and a center of one of the plurality of second patterns is about 20 μm or less, and the one of the plurality of first patterns contacts the one of the plurality of second patterns.

The first pattern and the second pattern may overlap the folding region, when viewed in a plan view.

According to an embodiment, a method of manufacturing a display device includes manufacturing a display module, manufacturing a window, and manufacturing a protective layer. The manufacturing of the protective layer includes forming a coating layer, forming an anti-fingerprint pattern layer on a first portion of the coating layer, and forming a lower-reflection pattern layer on a second portion of the coating layer.

The forming of the anti-fingerprint pattern layer may include disposing a mask, which has a plurality of mask holes defined in the mask, on the coating layer, and forming the anti-fingerprint pattern layer overlapping with the plurality of mask holes of the mask on the coating layer. The anti-fingerprint pattern layer includes a plurality of first patterns.

The forming of the lower-reflection pattern layer includes removing the mask to form a plurality of pattern holes among the plurality of first patterns and forming the lower-reflection pattern layer in the plurality of pattern holes. The lower-reflection pattern layer includes a plurality of second patterns, and each of the plurality of second patterns and each of the plurality of first patterns are alternately arranged.

According to an embodiment, the method of manufacturing a display device may further include forming an anti-fingerprint layer on the lower-reflection pattern layer and the anti-fingerprint pattern layer, after forming the low-reflection pattern layer.

A folding region and a non-folding region may be defined in the protective layer, and the anti-fingerprint pattern layer may overlap the folding region when viewed in a plan view.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
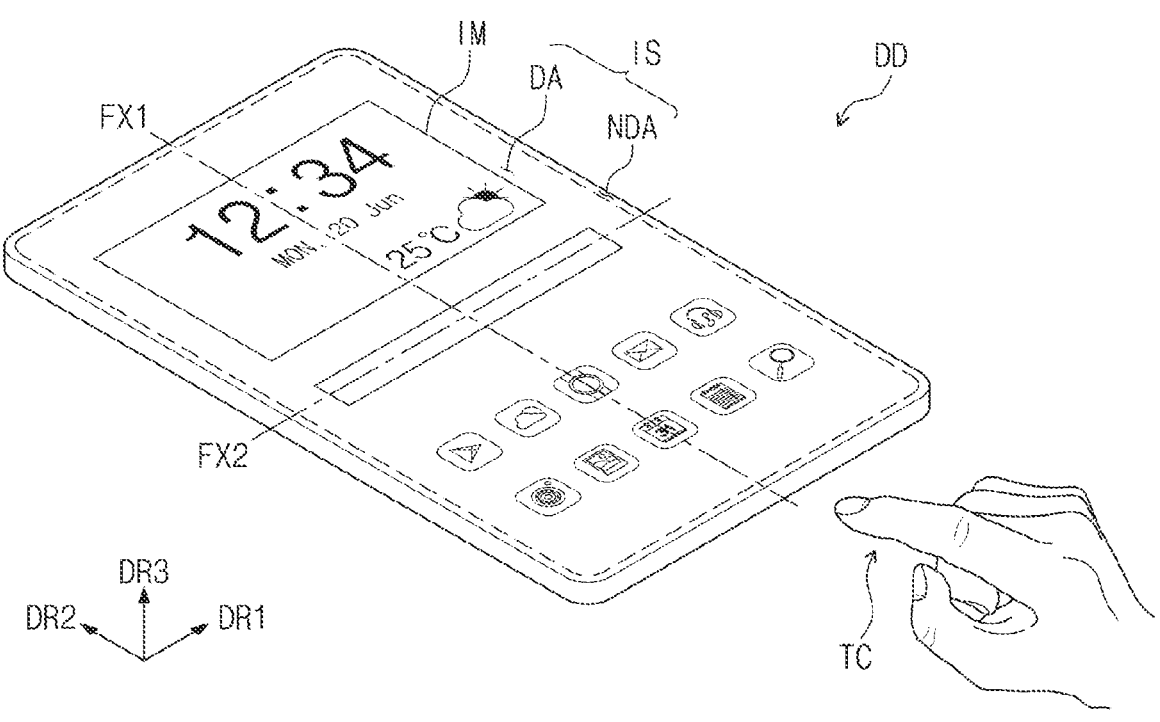
FIG. 1 is a perspective view of a display device according to an embodiment of the present disclosure.

While the present disclosure is susceptible to various modifications and alternative forms, specific embodiments thereof are shown by way of examples in the drawings and will be herein described in detail. It should be understood, however, that there is no intent to limit the present disclosure to the particular forms disclosed, but on the contrary, the present disclosure is to cover all modifications, equivalents, and alternatives falling within the spirit and scope of the invention.

In the specification, when one component (or region, layer, part, or the like) is referred to as being "on", "connected to", or "coupled to" another component, it should be understood that the former may be directly on, connected to, or coupled to the latter, and also may be on, connected to, or coupled to the latter via a third intervening component.

The same reference numeral refers to the same component. In addition, in drawings, thicknesses, proportions, and dimensions of components may be exaggerated to describe the technical features effectively.

The term "and/or" includes one or more combinations of the associated listed items.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. The terms are relative and are described with reference to a direction indicated in the drawing.

Unless otherwise defined, all terms (including technical terms and scientific terms) used in the specification have the same meaning as commonly understood by one skilled in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined herein.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

FIG. 1 is a perspective view of a display device according to an embodiment of the present disclosure.

Referring to FIG. 1, according to an embodiment of the present disclosure, a display device DD may have a rectangular shape having a shorter side parallel to a first direction DR1 and a longer side parallel to a second direction DR2 crossing the first direction DR1. However, the shape of the display device DD is not limited thereto, but various display devices DD having various shapes may be provided. For example, the display device DD may have a rectangular shape having a longer side parallel to the first direction DR1 and a short side parallel to the second direction DR2, or may have a square shape having an equal length in a side parallel to the first direction DR1 and a side parallel to the second direction DR2.

The display device DD may be a foldable electronic device. In detail, according to an embodiment, the display device DD may be folded about a folding axis FX1 or FX2 extending in a specific direction. Hereinafter, a state, in which the display device DD is folded about the folding axis FX1 or FX2, is defined as a folding state, and a state in which the display device DD is not folded about the folding axis FX1 or FX2, is defined as a non-folding state. The folding axis FX1 or FX2 is a rotating axis which is a virtual line formed when the display device DD is folded. For example, the folding axis FX1 or FX2 may be formed by a mechanism structure included in the display device DD.

The folding axis FX1 or FX2 may extend in the first direction DR1 or the second direction DR2. According to an embodiment, the folding axis extending in the second direction DR2 is defined as the first folding axis FX1, and a folding axis extending in the first direction DR1 is defined as a second folding axis FX2. The display device DD may be folded about any one of the first folding axis FX1 and the second folding axis FX2.

According to an embodiment, the display device DD may be a small and medium-sized electronic device, such as a mobile phone, a tablet PC, a vehicle navigation system, a game console, and the like as well as a large-sized electronic device, such as a television, a monitor, and the like. The above example may be provided only for the illustrative purpose, and may be employed even to another electronic device.

As illustrated in FIG. 1, the display device DD may display an image IM, in a third direction DR3, on a display surface IS parallel to the first direction DR1 and the second direction DR2. The display surface IS on which the image IM is displayed may correspond to a front surface of the display device DD.

The display surface IS of the display device DD may be divided into a plurality of regions. The display surface IS of the display device DD may have a display region DA and a non-display region NDA defined therein. The display region DA may be a region for displaying the image IM, and a user can view the image IM through the display region DA. The display region DA may have a rectangular shape. The non-display region NDA may surround the display region DA. Accordingly, a shape of the display region DA may be defined substantially by the non-display region NDA. However, the above shape of the display region DA is provided for the illustrative purpose. For example, the non-display region NDA may be disposed to be adjacent to only one side of the display region DA or may be omitted. According to an embodiment, the display device DD may include various embodiments, and not limited to any one embodiment.

The non-display region NDA, which is a region adjacent to the display region DA, may be a region in which the image IM is not displayed. A bezel region of the display device DD may be defined by the non-display region NDA.

According to the present disclosure, the display device DD may sense a user input TC of a user applied from the outside. The user input TC includes various types of external inputs such as a portion of a body of the user, a light, heat, and pressure. According to an embodiment, the user input TC is illustrated as a user hand applied to the front surface. However, the user input TC described above is provided only for the illustrative purpose. For example, the user input TC may be provided in various shapes. In addition, the display device DD may sense the user input TC applied to the side surface or the rear surface of the display device DD depending on the structure of the display device DD, and the present disclosure is not limited to any one embodiment.

The display device DD may display the image IM by activating the display surface IS while sensing the user input TC. According to an embodiment, the region for sensing the user input TC is provided in the display region DA in which the image IM is displayed. However, the above example is provided only for the illustrative purpose. The region for sensing the user input TC may be provided in the non-display region NDA or may be provided in all regions of the display surface IS.

Figure 2A:
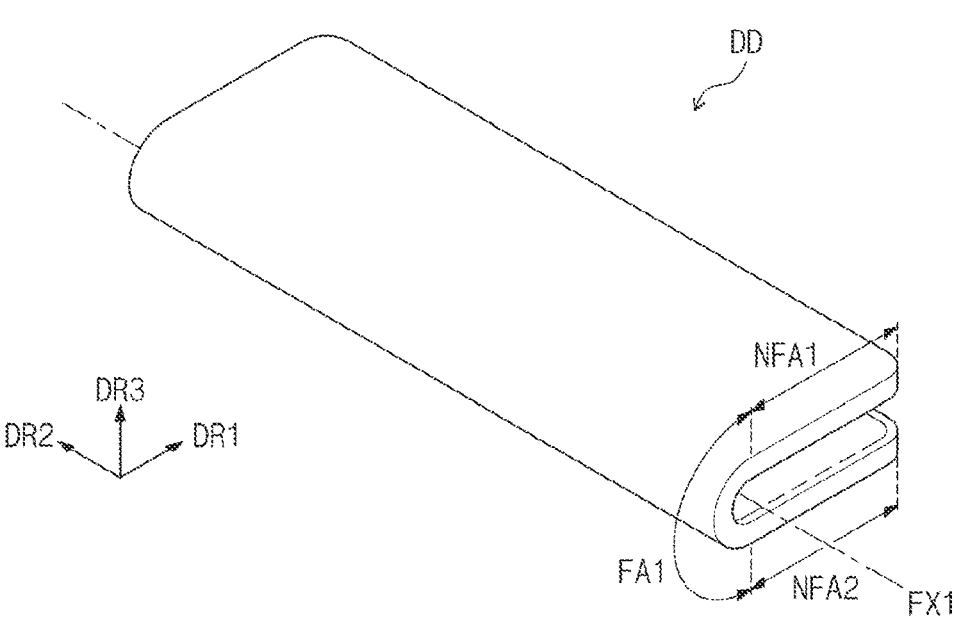
FIG. 2A is a view illustrating the display device of FIG. 1, which is in an in-folding state along a first folding axis.
Figure 2B:
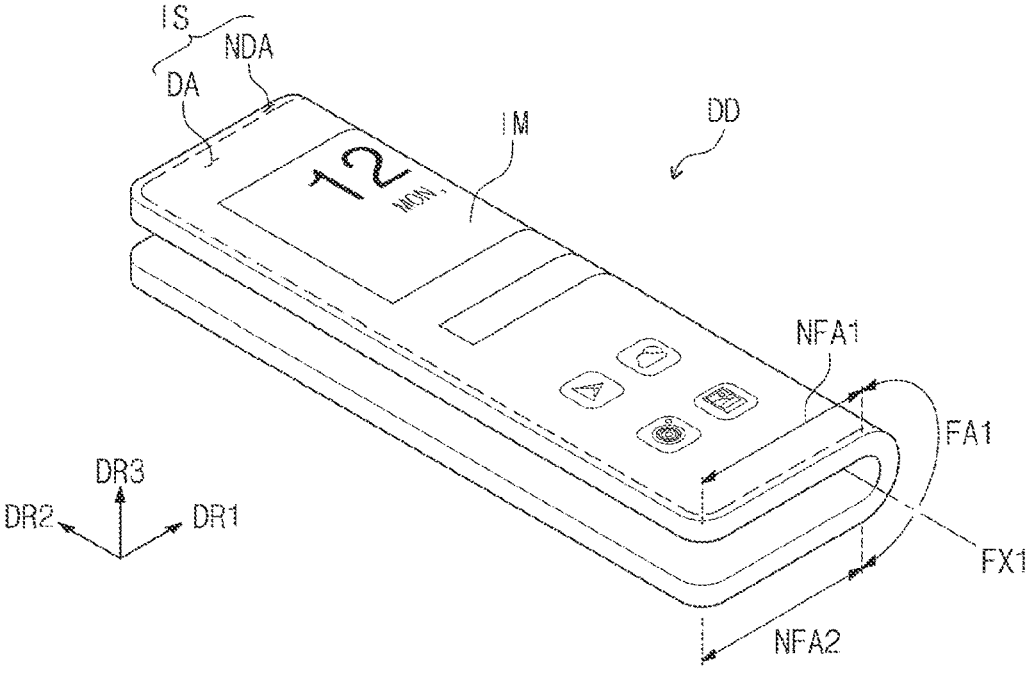
FIG. 2B is a view illustrating the display device of FIG. 1 which is an out-folding state along the first folding axis.

FIG. 2A is a view illustrating the display device of FIG. 1, which is in an in-folding state along a first folding axis. FIG. 2B is a view illustrating the display device of FIG. 1 which is an out-folding state along the first folding axis.

Referring to FIGS. 1 and 2A, the display device DD may be a foldable display device. The display device DD may be folded about a folding axis (for example, the first folding axis FX1 or the second folding axis FX2) extending in a specific direction. FIG. 2A illustrates the display device DD folded about the first folding axis FX1 extending in the second direction DR2.

A plurality of regions may be defined in the display device DD depending on an action type. The plurality of regions may be divided into a first folding region FA1 and at least one non-folding region NFA1 or NFA2. The first folding region FA1 is defined between two non-folding regions NFA1 and NFA2.

The first folding region FA1, which is a region folded about the first folding axis FX1, is a substantially curved region. In this case, the first folding axis FX1 may extend in the second direction DR2, that is, a longer-axis of the display device DD. The first folding region FA1 is defined as a region folded in the first folding axis FX1 and extending in the second direction DR2.

According to an embodiment, non-folding regions NFA1 and NFA2 may include a first non-folding region NFA1 and a second non-folding region NFA2. The first non-folding region NFA1 may be adjacent to one side of the first folding region FA1 in the first direction DR1, and the second non-folding region NFA2 may be adjacent to an opposite side of the first folding region FA1 in the first direction DR1.

The display device DD may be in the in-folding state or the out-folding state. The in-folding state is referred to as the state, in which the display surface IS is folded such that opposite sides of the display surface IS face each other, and the out-folding state is referred to as the state in which opposite sides of the rear surface of the display device DD are folded to face each other. In detail, the in-folding state is defined as the state in which mutually different display surfaces of the non-folding regions NFA1 and NFA2 face each other, and the out-folding state is defined as the state in which mutually different display surfaces of the non-folding regions NFA1 and NFA2 are folded to face outward.

The display device DD illustrated in FIG. 2A is in the in-folding state such that the display surface IS of the first non-folding region NFA1 and the display surface IS of the second non-folding region NFA2 face each other. As the first non-folding region NFA1 is rotated clockwise along the first folding axis FX1, the display device DD may be in the in-folding state. The first folding axis FX1 may be defined at the center of the display device DD in the first direction DR1. The display device DD may be folded about the first folding axis FX1 in the in-folding state such that the first non-folding region NFA1 and the second non-folding region NFA2 are aligned with each other.

Referring to FIG. 2B, the display device DD may be in the out-folding state about the first folding axis FX1. The display device DD may display the image IM, when the display surface IS of the first non-folding region NFA1 and the display surface IS of the second non-folding region NFA2 are exposed to the outside. In addition, the image IM may be displayed on the display surface IS of the first folding region FA1 exposed to the outside. As illustrated in FIG. 1, the display device DD may display the image IM in a flat state. The first non-folding region NFA1, the second non-folding region NFA2, and the first folding region FA1 may display images providing independent information, respectively, or may display portions of one image providing one pieces of information.

The display device DD may be manufactured to have both the in-folding state and the out-folding state, or may be manufactured to have any one of the in-folding state and the out-folding state.

Meanwhile, FIGS. 2A and 2B illustrate that one first folding region FA1 is defined in the display device DD, but the present disclosure is not limited thereto. For example, according to an embodiment, a plurality of folding regions may be defined in the display device DD.

Figure 3A:
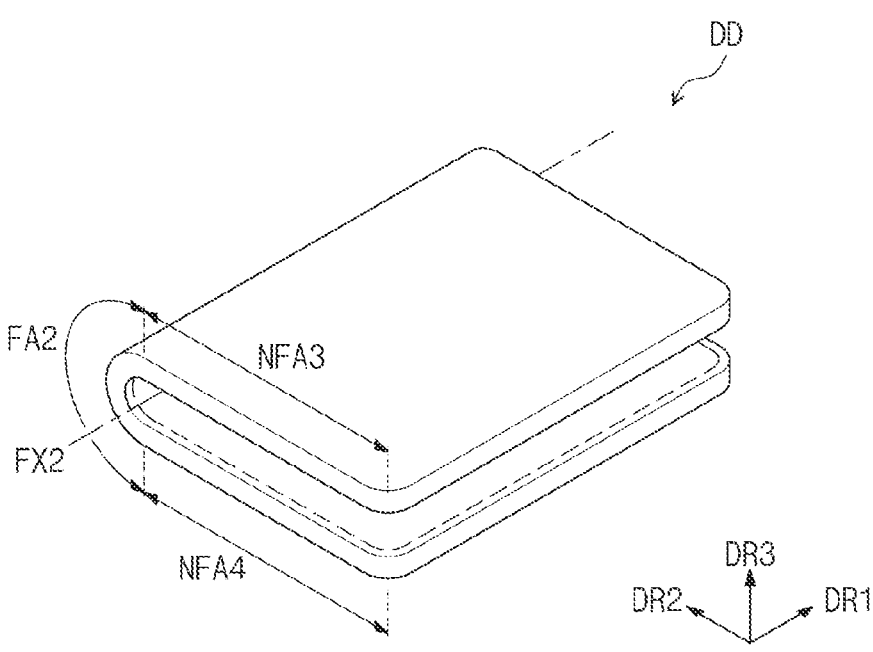
FIG. 3A is a view illustrating the display device of FIG. 1, which is in an in-folding state along a second folding axis.
Figure 3B:
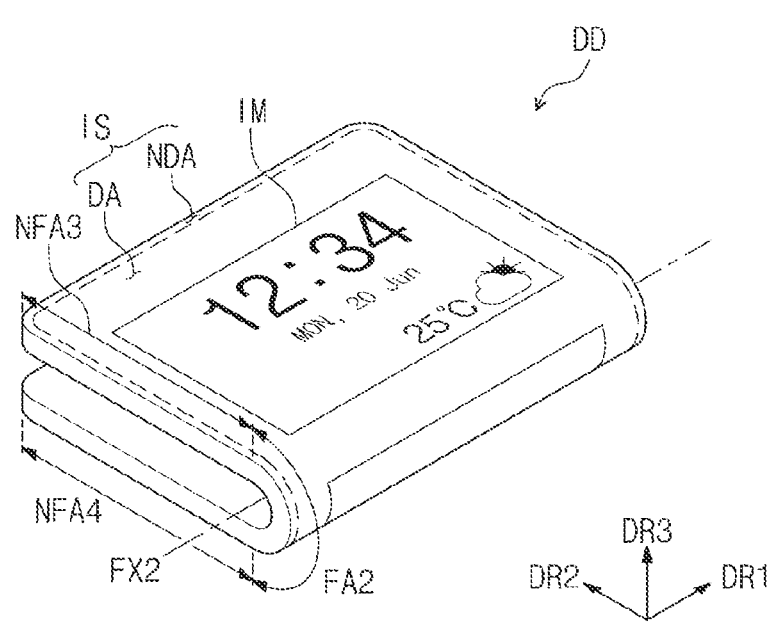
FIG. 3B is a view illustrating the display device of FIG. 1 which is an out-folding state along the second folding axis.

FIG. 3A is a view illustrating the display device of FIG. 1, which is in an in-folding state along a second folding axis. FIG. 3B is a view illustrating the display device of FIG. 1 which is an out-folding state along the second folding axis.

Referring to FIGS. 3A and 3B, the display device DD may be in the in-folding state or the out-folding state about the second folding axis FX2. In this case, the second folding axis FX2 may extend in the first direction DR1, that is, a shorter-axis of the display device DD.

A plurality of regions may be defined in the display device DD depending on an action type. The plurality of regions may be divided into a second folding region FA2 and at least one non-folding region NFA3 or NFA4. The second folding region FA2 is defined between two non-folding regions NFA3 and NFA4. For the convenience of description, the second folding region FA2 may be referred to as the folding region FA2.

The folding region FA2, which is a region folded about the second folding axis FX2, is a substantially curved region. The folding region FA2 is defined as a region folded in the second folding axis FX2 and extending in the first direction DR1.

According to an embodiment, the non-folding regions NFA3 and NFA4 may include the third non-folding region NFA3 and the fourth non-folding region NFA4. The third non-folding region NFA3 may be adjacent to one side of the folding region FA2 in the second direction DR2, and the fourth non-folding region NFA4 may be adjacent to an opposite side of the folding region FA2 in the second direction DR2.

Meanwhile, FIGS. 3A and 3B illustrate that one folding region FA2 is defined in the display device DD, but the present disclosure is not limited thereto. For example, according to an embodiment, a plurality of folding regions may be defined in the display device DD.

Figure 4:
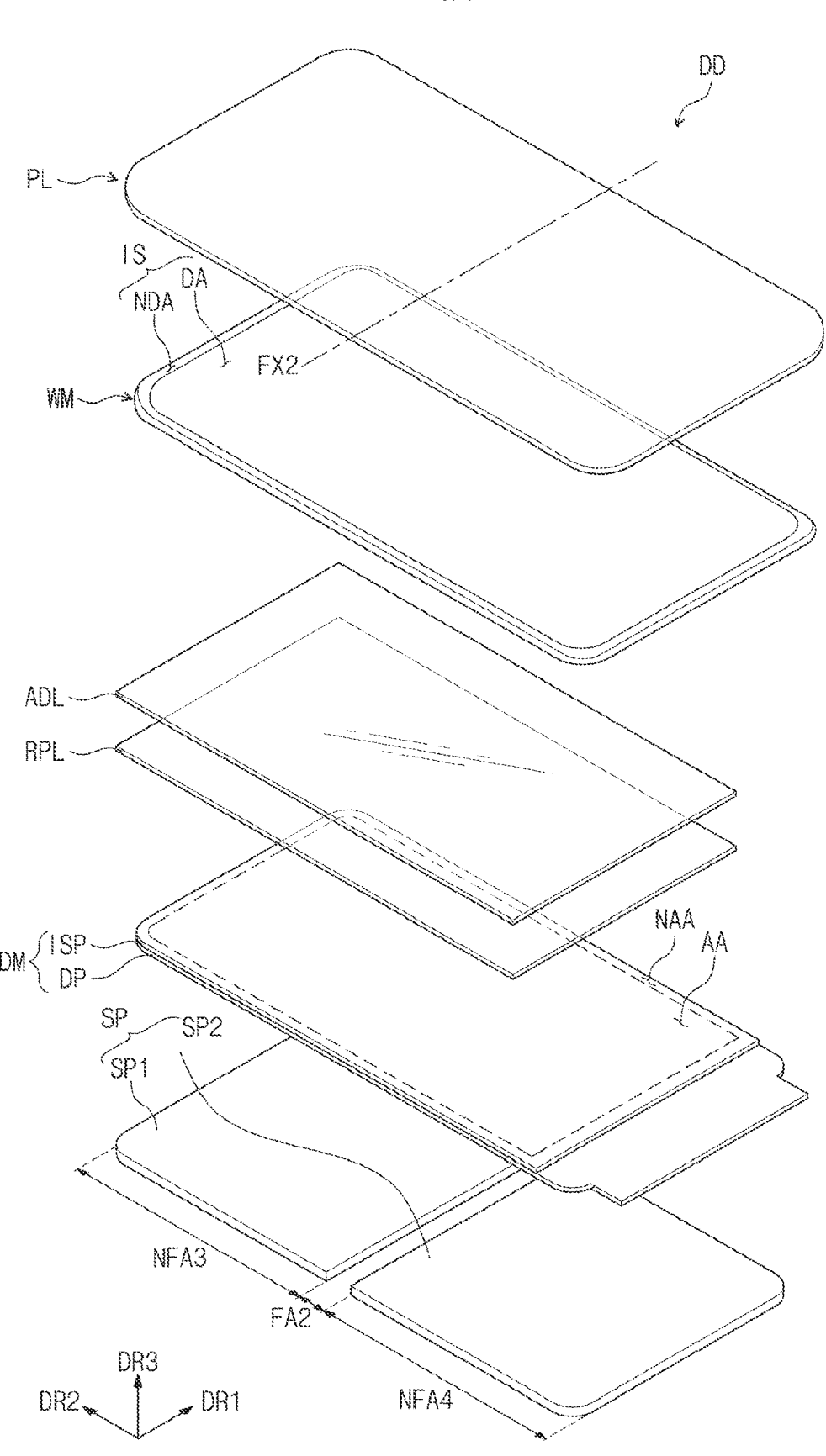
FIG. 4 is an exploded perspective view of a display device according to an embodiment of the present disclosure.

FIG. 4 is an exploded perspective view of a display device according to an embodiment of the present disclosure. Referring to FIG. 4, the display device DD according to an embodiment may include a display module DM to display an image, a window WM disposed on the display module DM, and a protective layer PL disposed on the window WM.

The display module DM may include a display panel DP and an input sensing unit ISP. The display panel DP according to an embodiment of the present disclosure may be a light emitting display panel, but is not specifically limited thereto. For example, the display panel DP may be an organic light emitting display panel, or a quantum dot light emitting display panel. The light emitting layer of the organic light emitting display panel may include or may be formed of an organic light emitting material. The light emitting layer of the quantum dot light emitting display panel may include a quantum dot, or a quantum rod, or the like. Hereinafter, the display panel DP is an organic light emitting display panel.

The display panel DP may be a flexible display panel. Accordingly, the display panel DP may be totally rolled or may be folded or unfolded about the second folding axis FX2.

The input sensing unit ISP may be directly disposed on the display panel DP. According to an embodiment, the input sensing unit ISP may be formed on the display panel DP through a subsequent process. In other words, when the input sensing unit ISP is directly disposed on the display panel DP, an adhesive film (not illustrated) is not interposed between the input sensing unit ISP and the display panel DP. However, the present disclosure is not limited thereto. The adhesive film may be interposed between the input sensing unit ISP and the display panel DP. In this case, the input sensing unit ISP is not manufactured through the process subsequent to the process of the display panel DP. For example, the input sensing unit ISP may be manufactured through a process separate from a process of the display panel DP and then fixed on a top surface of the display panel DP by the adhesive film.

The display panel DP generates an image, and the input sensing unit ISP acquires coordinate information for a user input (for example, a touch event).

The window WM may be disposed on the display module DM. The window WM may include or may be formed of an optically transparent material. Accordingly, the image generated from the display module DM may be easily viewed by a user through the window WM.

For example, the window WM may include or may be a glass substrate or a synthetic resin film. When the window WM is a thin film glass, the thickness of the window WM may be about 80 μm or less, for example, about 30 μm, but the thickness of the window WM is not limited thereto. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

When the window WM is the synthetic resin film, the window WM may include or may be formed of a polyimide (PI) film or a polyethylene terephthalate (PET) film.

The window WM may include a multi-layer structure or a single layer structure. For example, the window WM may include or may be formed of a plurality of synthetic resin films bonded by an adhesive or may have a glass substrate and a synthetic resin film bonded by an adhesive. The window WM may include or may be formed of a flexible material. Accordingly, the window WM may be folded or unfolded about the second folding axis FX2. In other words, the window WM may be changed in shape while the shape of the display module DM is changed.

The window WM transmits the image from the display module DM or reduces an external impact, thereby preventing the display module DM from being broken or erroneously operated due to the external impact. The external impact, which is external force expressed as pressure or stress, is referred to as force causing the defect of the display module DM.

The protective layer PL is disposed on the window WM. The protective layer PL may protect the window WM from the external impact, and prevent the window WM from being scattered when the window WM is broken. The structure of the protective layer PL will be described later.

At least one functional layer may be interposed between the display module DM and the window WM. For example, according to an embodiment, the functional layer may be an anti-reflective layer RPL to block the reflection of external light between the display module DM and the window WM. The anti-reflective layer RPL may prevent components of the display module DM from being viewed from the outside by the external light incident through the entire surface of the display device DD. The anti-reflective layer RPL may include a retarder and a polarizer. The retarder may be provided in a film type or a liquid crystal coating type, and may include a λ/2 retarder and/or a λ retarder. The polarizer may also have a film type or a liquid crystal coating type. The film type polarizer may include or may be formed of a stretched synthetic resin film, and the liquid crystal coating type polarizer may include or may be formed of liquid crystals aligned in a specific array. The retarder and the polarizer may be implemented with one polarization film. Meanwhile, according to an embodiment, the display device DD may further include a protective film disposed at an upper portion or a lower portion of the anti-reflective layer RPL.

The anti-reflective layer RPL may be disposed on the input sensing unit ISP. In other words, the anti-reflective layer RPL may be interposed between the input sensing unit ISP and the window WM. The anti-reflective layer RPL and the window WM may be bonded with each other through an adhesive layer ADL. Although not illustrated, an adhesive film may be further provided between the input sensing unit ISP and the anti-reflective layer RPL to fix the anti-reflective layer RPL to the input sensing unit ISP.

For example, the adhesive layer ADL may include or may be formed of an optically clear adhesive film (OCA). However, the adhesive layer ADL is not limited thereto, but may include a typical adhesive agent and adhesion agent. For example, the adhesive layer ADL may include or may be formed of an optically clear resin (OCR) or a pressure sensitive adhesive (PSA) film.

The display module DM may display an image in response to an electrical signal, and may transmit/receive information about an external input. The display module DM may be defined with an active region AA and a peripheral region NAA. The active region AA may be defined as a region through which an image provided from the display region DA is output.

The peripheral region NAA is adjacent to the active region AA. For example, the peripheral region NAA may surround the active region AA. However, the above form is provided for the illustrative purpose. For example, the peripheral region NAA may have various forms, and not limited to any one embodiment. According to an embodiment, the active region AA of the display module DM may correspond to at least a portion of the display region DA.

The display device DD further includes a support plate SP disposed on a rear surface of the display module DM to support the display module DM. The support plate SP may include or may be formed of a material that has stiffness. For example, the support plate SP may include or may be formed of a rigid material. The support plate SP may include or may be formed of a material having an elastic coefficient of about 10 GPa or more. For example, although the support plate SP includes glass, the material constituting the support plate SP is not limited thereto. The thickness of the support plate SP may be selected from a range of about 50 μm to about 400 μm, but the present disclosure is not limited thereto.

The support plate SP may include support plates SP1 and SP2 provided in numbers corresponding to the non-folding regions NFA3 and NFA4. For example, the support plate SP may include the first support plate SP1 and the second support plate SP2 spaced apart from the first support plate SP1. The first and second support plates SP1 and SP2 may be disposed to correspond to the non-folding regions NFA3 and NFA4. In other words, the first support plate SP1 is disposed to correspond to the third non-folding region NFA3 of the display module DM, and the second support plate SP2 is disposed to correspond to the fourth non-folding region NFA4 of the display module DM. When the display module DM is folded about the second folding axis FX2, the first and second support plates SP1 and SP2 may be disposed to be spaced apart from each other in the second direction DR2.

The first and second support plates SP1 and SP2 may be spaced apart from each other with the folding region FA2 therebetween. The first and second support plates SP1 and SP2 may partially overlap the folding region FA2. In other words, the spacing between the first and second support plates SP1 and SP2 may be less than the width of the folding region FA2.

The support plate SP may further include a coupling module to connect the first support plate SP1 to the second support plate SP2. The coupling module may include a hinge module or a multi-joint module.

Although the support plate SP includes two support plates SP1 and SP2, the present disclosure is not limited thereto. In other words, when the number of second folding axes FX2 is increased, the support plate SP may include a plurality of support plates spaced apart from each other about the second folding axis FX2.

Although FIG. 4 illustrates that the support plate SP is divided into the first support plate SP1 and the second support plate SP2, the present disclosure is not limited thereto. In other words, the support plate SP may be provided in an integral-plate form disposed to correspond to the first and second non-folding regions NFA3 and NFA4, and the folding region FA2. In this case, the support plate SP may include a plurality of holes formed in a portion, which is provided in the folding region FA2, of the support plate SP. For example, the support plate SP may be a single sheet with a plurality of holes in a region corresponding to the folding region FA2 such that the region with the plurality of holes may be folded.

A buffer film is further provided between the display module DM and the support plate SP. The buffer film may include or may be formed of a polymer material. The buffer film may be a layer to absorb an impact applied thereto from the outside. The buffer film may be bonded to each of the display module DM and the support plate SP through the adhesive film.

Figure 5:
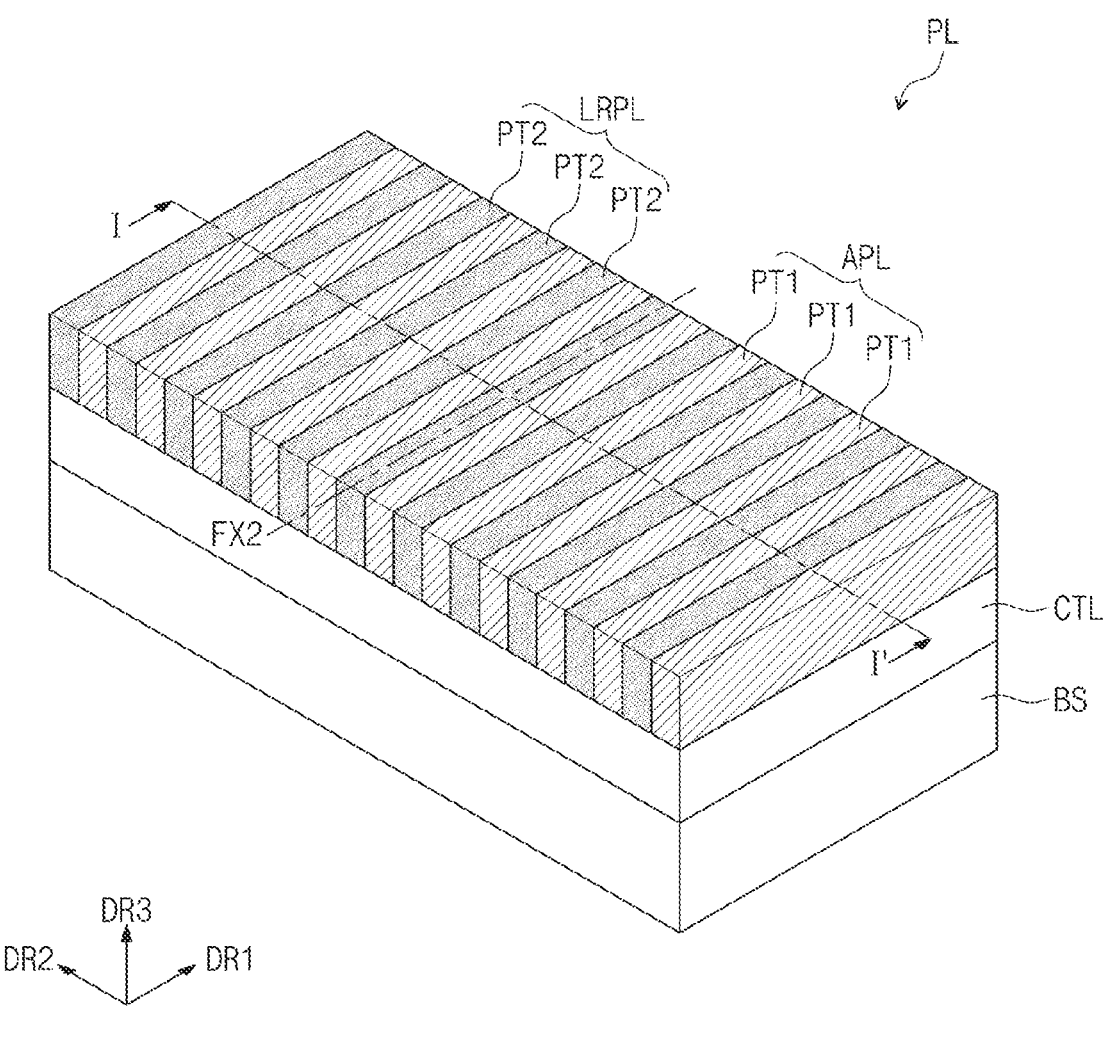
FIG. 5 is a perspective view of a protective layer according to an embodiment of the present disclosure.
Figure 6:
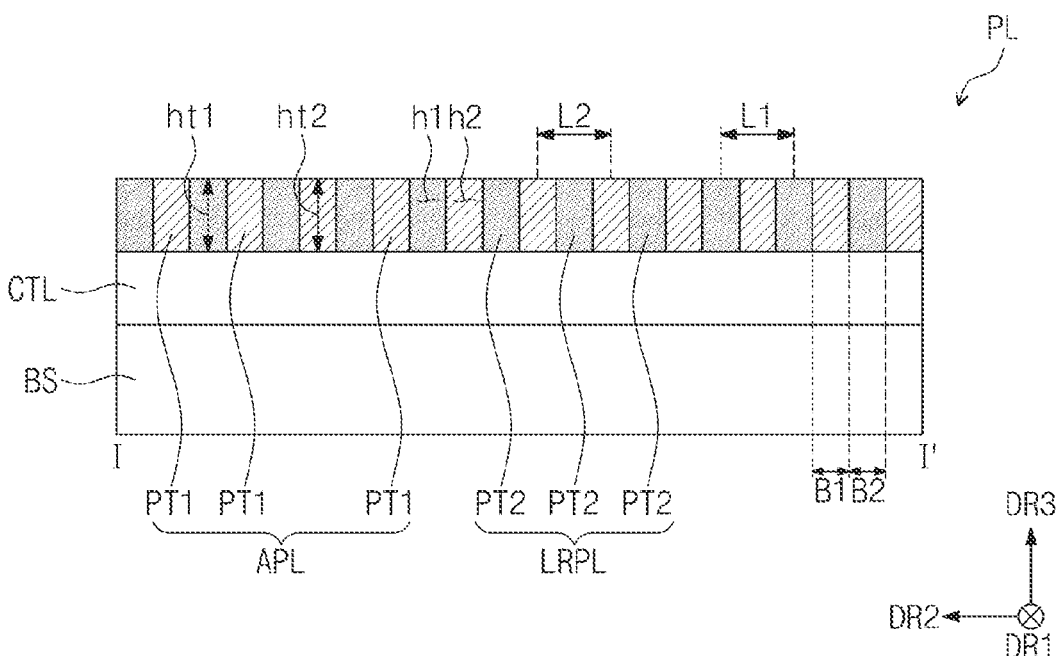
FIG. 6 is a cross-sectional view illustrating a protective layer taken along line I-I' of FIG. 5.

FIG. 5 is a perspective view of a protective layer according to an embodiment of the present disclosure FIG. 6 is a cross-sectional view illustrating a protective layer taken along line I-I' of FIG. 5.

Referring to FIG. 5, the protective layer PL may include a base layer BS, a coating layer CTL, an anti-fingerprint pattern layer APL, and a lower-reflection pattern layer LRPL.

The base layer BS may constitute a lower portion of the protective layer PL. The base layer BS may include or may be formed of a base material. The base material may include at least one of phenylene, polyethylene terephthalate (PET), polyimide (PI), polyamide (PAI), polyethylene naphthalate (PEN), polycarbonate (PC), and thermoplastic polyurethane (TPU). The base layer BS may further include an ultra-violet (UV) ray blocking material having the base material added thereto. For example, a UV blocking material may include or may be formed of an inorganic chemical such as zinc oxide (ZnO) and titanium dioxide (TiO2). The UV blocking material may reflect or scatter a UV ray. As described above, as the base layer BS includes the UV blocking material, the protective layer PL may have a function of blocking the UV ray. For example, the protective layer PL may transmit less than 20% of a UV ray having the wavelength of about 380 nm or less. In particular, when the window WM includes thin film glass, the window WM may have a weak UV blocking function. In this case, as the UV blocking material is included in the base layer BS, the UV ray may be blocked through the protective layer PL. The thickness of the base layer BS may be about 250 μm or less.

Referring to FIGS. 5 and 6, the coating layer CTL may be disposed on the base layer BS. According to an embodiment of the present disclosure, the coating layer CTL may include a first portion B1 for disposing the anti-fingerprint pattern layer APL and a second portion B2 for disposing the lower-reflection pattern layer LRPL. The first portion B1 and the second portion B2 may extend in the first direction DR1 and may be alternately arranged in the second direction DR2. The width of the first portion B1 provided in the second direction DR2 may be equal to the width of the second portion B2 provided in the second direction DR2.

The coating layer CTL may include or may be formed of a hard coating material. The hard coating material may include a high strength material having a pencil hardness of "F" or greater. According to an embodiment of the present disclosure, the hard coating material may include at least one of a siloxane resin, an epoxy resin, and an acrylic resin. The coating layer CTL may have a thickness selected from a range of about 3 μm to about 10 μm. In particular, the coating layer CTL may have a thickness selected from a range of about 4 μm to about 6 μm, but the present disclosure is not limited thereto. When the thickness of the coating layer CTL is greater than about 10 μm, flexibility may be decreased. When the thickness of the coating layer CTL is less than about 3 μm, the surface hardness of the coating layer CTL may be decreased.

The anti-fingerprint pattern layer APL may be disposed on the first portion B1 of the coating layer CTL. More specifically, the anti-fingerprint pattern layer APL may directly contact the top surface of the coating layer CTL in the first portion B1. The anti-fingerprint pattern layer APL may include a plurality of first patterns PT1. As a plurality of first portions B1 are provided, a plurality of first patterns PT1 of the anti-fingerprint pattern layer APL may be disposed on the plurality of first portions B1 such that the plurality of first patterns PT1 correspond to the plurality of first portions B1.

The anti-fingerprint pattern layer APL may include or may be formed of an anti-fingerprint material. The anti-fingerprint material may include a water repellent material or an oil repellent material to improve contamination resistance of the coating layer CTL. According to an embodiment, the anti-fingerprint material may include or may be formed of an inorganic particle including a fluorine-based material. The fluorine-based material may include or may be formed of one of polytetrafluoroethylene (PTFE), polyvinylidene fluoride (PVDF), and Teflon AF (Cytop).

The lower-reflection pattern layer LRPL may be disposed on the second portion B2 of the coating layer CTL. In detail, the lower-reflection pattern layer LRPL may directly contact the top surface of the coating layer CTL in the second portion B2. The lower-reflection pattern layer LRPL may include a plurality of second patterns PT2. As the plurality of second portions B2 are provided, the plurality of second patterns PT2 of the lower-reflection pattern layer LRPL may be disposed on the plurality of second portions B2 such that the plurality of second patterns PT2 correspond to the plurality of second portions B2.

The lower-reflection pattern layer LRPL may include or may be formed of a material for preventing reflection. The lower-reflection pattern layer LRPL may include or may be formed of an inorganic material. For example, the lower-reflection pattern layer LRPL may include or may be formed of at least one of $Nb_2O_5$, $Ta_2O_5$, $Na_3AlF_6$, $MgF_2$, $AlF_3$, $LiF_2$, $CaF_2$, $SiO_2$, $Al_2O_3$, $TiO_2$, $SnO_2$, $Y_2O_3$, MgO, and a combination thereof. The lower-reflection pattern layer LRPL may have a refractive index appropriately adjusted depending on the combination of the materials. The lower-reflection pattern layer LRPL may increase screen visibility for a user by reducing the surface reflection index of the external light. According to an embodiment of the present disclosure, the lower-reflection pattern layer LRPL may include a plurality of layers. As the lower-reflection pattern layer LRPL includes layers having mutually different refractive indexes, the reflection index of the external light may be reduced.

The anti-fingerprint pattern layer APL and the lower-reflection pattern layer LRPL may extend in the first direction DR1 and may be alternately arranged in the second direction DR2. More specifically, the plurality of first patterns PT1 of the anti-fingerprint pattern layer APL and the plurality of second patterns PT2 of the lower-reflection pattern layer LRPL may extend in the first direction DR1, and each of the plurality of second patterns PT2 may be interposed between the plurality of first patterns PT1 of the anti-fingerprint pattern layer APL. The width of each first pattern PT1 provided in the second direction DR2 may be equal to the width of each second pattern PT2 provided in the second direction DR2.

Referring to FIG. 6, a first hole h1 may be defined in the anti-fingerprint pattern layer APL. Specifically, the anti-fingerprint pattern layer APL may include the plurality of first patterns PT1, and each of a plurality of first holes h1 may be defined between the plurality of first patterns PT1. In other words, each of the plurality of first holes h1 may be formed in a space in which the plurality of first patterns PT1 are spaced apart from each other, and the plurality of first holes h1 may have an equal width in the second direction DR2. The number of first patterns PT1 is not specifically limited thereto.

A second hole h2 may be defined in the lower-reflection pattern layer LRPL. Specifically, the lower-reflection pattern layer LRPL may include the plurality of second patterns PT2, and each of a plurality of second holes h2 may be defined between the plurality of second patterns PT2. In other words, each of the plurality of second holes h2 may be formed in a space in which the plurality of second patterns PT2 are spaced apart from each other, and the plurality of second holes h2 may have an equal width in the second direction DR2. The number of second patterns PT2 is not specifically limited thereto.

According to an embodiment of the present disclosure, the lower-reflection pattern layer LRPL may be disposed in the first hole h1. In detail, the plurality of second patterns PT2 may be disposed in the plurality of first holes h1, respectively. As the plurality of second patterns PT2 may be disposed in the plurality of first holes h1, respectively, the lateral side of the each of the plurality of second patterns PT2 may directly contact the lateral side (i.e., a sidewall) of the each of the plurality of first pattern PT1. In some embodiments, the lateral side may extend vertically in the third direction DR3.

According to an embodiment of the present disclosure, the anti-fingerprint pattern layer APL may be disposed in the second hole h2. In detail, the plurality of first patterns PT1 may be disposed in the plurality of second holes h2, respectively. As the plurality of first patterns PT1 may be disposed in the plurality of second holes h2, respectively, the lateral side of the each of the plurality of first patterns PT1 may directly contact the lateral side of the each of the plurality of second pattern PT2.

As the plurality of first patterns PT1 and the plurality of second patterns PT2 are formed on the coating layer CTL while the plurality of first patterns PT1 alternately contact the plurality of second patterns PT2, when compared to the anti-fingerprint pattern layer APL and the lower-reflection pattern layer LRPL disposed in mutually different layers, compressive force and tensile stress force applied to each of the anti-fingerprint pattern layer APL and the lower-reflection pattern layer LRPL are dispersed, thereby preventing the anti-fingerprint pattern layer APL and the lower-reflection pattern layer LRPL from being broken by folding. In addition, as the anti-fingerprint pattern layer APL is bonded (provided or formed) with the coating layer CTL while directly contacting the top surface of the coating layer CTL, the protective layer PL may exhibit an improved abrasion resistance due to the increased coupling force between the anti-fingerprint pattern layer APL and the coating layer CTL.

According to an embodiment of the present disclosure, the width of the first hole h1 provided in the second direction DR2 may be equal to the width of the second hole h2 provided in the second direction DR2. As illustrated in the drawing, although the first hole h1 and the second hole h2 have a rectangular shape when viewed in a cross-sectional view, the present disclosure is not limited thereto. For example, the first hole h1 and the second hole h2 may have a trapezoidal or hemispherical shape, when viewed in a cross-sectional view. The width of the first hole h1 provided in the second direction DR2 may be different from the width of the second hole h2 provided in the second direction DR2. A first height ht1 of the first hole h1 may be equal to a second height ht2 of the second hole h2. For example, the first height ht1 and the second height ht2 may be selected from a range of about 10 nm to about 300 nm. The first height ht1 may correspond to a thickness of the lower-reflection pattern layer LRPL, specifically, the thickness of the second pattern PT2 in the third direction DR3. The second height ht2 may correspond to a thickness of the anti-fingerprint pattern layer APL, specifically, the thickness of the first pattern PT1 in the third direction DR3.

Each of the plurality of first holes h1 may include a central portion in the second direction DR2. According to an embodiment of the present disclosure, the distance between centers of two adjacent first holes h1 of the plurality of first holes h1 may be defined as a first spacing L1, and the first spacing L1 may be about 20 μm or less. Since the plurality of second patterns PT2 are disposed in the plurality of first holes h1, respectively, the distance between the central portions of two adjacent second patterns PT2 of the plurality of second patterns PT2 may be about 20 μm or less.

Each of the plurality of second holes h2 may include a central portion in the second direction DR2. According to an embodiment of the present disclosure, the distance between the central portions of two adjacent second holes h2 of the plurality of second holes h2 may be defined as a second spacing L2, and the second spacing L2 may be about 20 μm or less. Since the plurality of first patterns PT1 are disposed in the plurality of second holes h2, respectively, the distance between the central portions of two adjacent first patterns PT1 of the plurality of first patterns PT1 may be about 20 μm or less.

Since the distance between the central portions of two adjacent second patterns PT2 of the plurality of second patterns PT2 is 20 μm or less, and the distance between the centers of two adjacent first patterns PT1 of the plurality of first patterns PT1 is about 20 μm or less, the distance between the central portion of the first pattern PT1 and the central portion of the second pattern PT2 adjacent to the first pattern PT1 may be about 10 μm or less. As the distance between the plurality of patterns is decreased, compressive force and tensile stress force applied to the plurality of patterns may be reduced in the folded region in folding. Accordingly, since the distance between the central portion of the first pattern PT1 and the central portion of the second pattern PT2 adjacent to the first pattern PT1 is formed to be about 10 μm or less, compressive force and tensile stress force applied to the anti-fingerprint pattern layer APL and the lower-reflection pattern layer LRPL are dispersed in folding, thereby preventing the anti-fingerprint pattern layer APL and the lower-reflection pattern layer LRPL from being broken by folding.

Figure 7A:
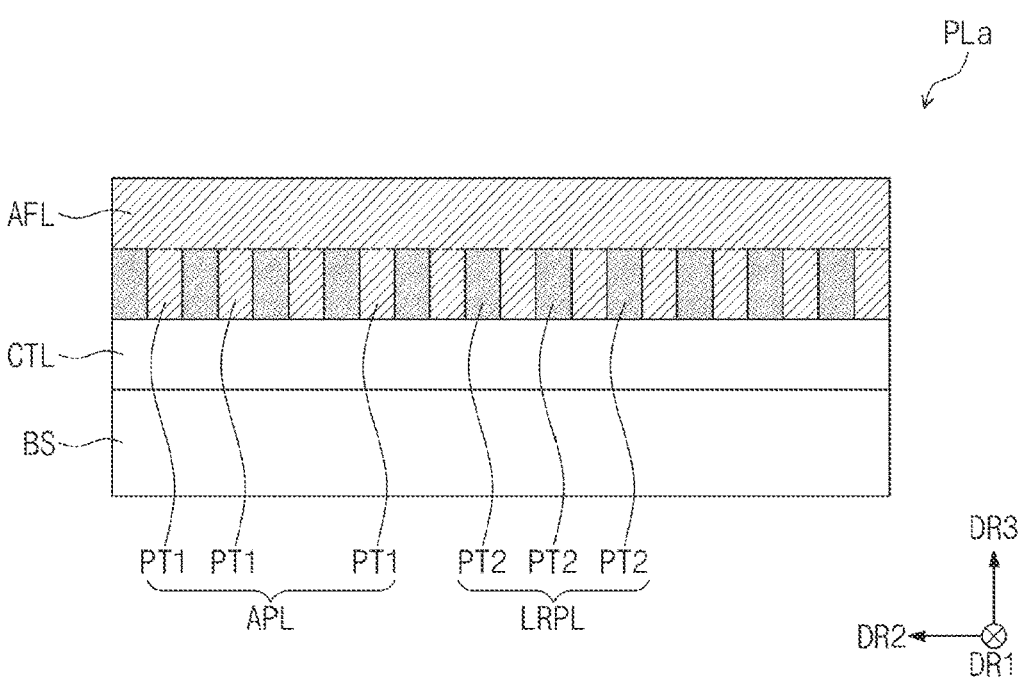
FIG. 7A is a cross-sectional view of a protective layer according to an embodiment of the present disclosure.
Figure 7B:
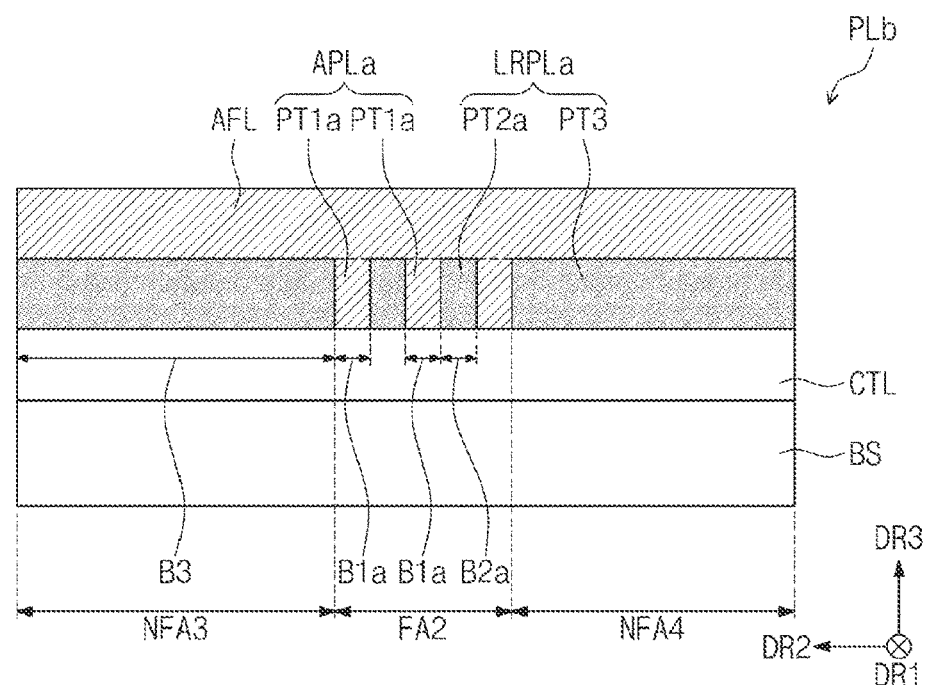
FIG. 7B is a cross-sectional view of a protective layer according to an embodiment of the present disclosure.

FIG. 7A is a cross-sectional view of a protective layer according to an embodiment of the present disclosure FIG. 7B is a cross-sectional view of a protective layer according to an embodiment of the present disclosure.

Referring to FIG. 7A, a protective layer PLa may include the base layer BS, the coating layer CTL, the anti-fingerprint pattern layer APL, the lower-reflection pattern layer LRPL, and an anti-fingerprint layer AFL.

According to an embodiment of the present disclosure, the anti-fingerprint layer AFL may be disposed on the anti-fingerprint pattern layer APL and the lower-reflection pattern layer LRPL. The anti-fingerprint layer AFL may be directly disposed on the anti-fingerprint pattern layer APL and the lower-reflection pattern layer LRPL, after forming the anti-fingerprint pattern layer APL and the lower-reflection pattern layer LRPL. In other words, the anti-fingerprint layer AFL may overlap both the anti-fingerprint pattern layer APL and the lower-reflection pattern layer LRPL when viewed in a plan view, and may be directly disposed on the anti-fingerprint pattern layer APL and integrally connected to the anti-fingerprint pattern layer APL.

The anti-fingerprint pattern layer APL may include or may be formed of an anti-fingerprint material. The anti-fingerprint layer AFL may include a material that is the same as a material of the anti-fingerprint pattern layer APL. Accordingly, the anti-fingerprint material included in the anti-fingerprint layer AFL may include or may be formed of a water repellent material or an oil repellent material to improve contamination resistance of the coating layer CTL. According to an embodiment of the present disclosure, the anti-fingerprint material may include or may be formed of a fluorine-based material. The fluorine-based material may include or may be formed of one of polytetrafluoroethylene (PTFE), polyvinylidene fluoride (PVDF), and Teflon AF (Cytop).

The anti-fingerprint layer AFL is disposed on the anti-fingerprint pattern layer APL and the lower-reflection pattern layer LRPL, thereby improving the slip properties and scratch resistance of the surfaces of the anti-fingerprint pattern layer APL and the lower-reflection pattern layer LRPL. In addition, the anti-fingerprint layer AFL is disposed in the outermost portion of the protective layer PLa to define the upper most surface of the protective layer PLa. Accordingly, the window WM disposed under the anti-fingerprint layer AFL may be protected from a fingerprint from the user, moisture, or other contaminants.

Referring to FIG. 7B, a protective layer PLb may include the base layer BS, the coating layer CTL, an anti-fingerprint pattern layer APLa, a lower-reflection pattern layer LRPLa, and an anti-fingerprint layer AFL.

According to an embodiment of the present disclosure, the coating layer CTL disposed on the base layer BS may include a first portion B1a for disposing the anti-fingerprint pattern layer APLa, a second portion B2a for disposing the lower-reflection pattern layer LRPLa, and a third part B3. Each of the first portion B1a, the second portion B2a, and the third part B3 extends in the first direction DR1. In the folding region, the first and second portions B1a and B2a may be alternately arranged in the second direction DR2.

The lower-reflection pattern layer LRPLa may be disposed on the coating layer CTL. Specifically, the lower-reflection pattern layer LRPLa may include a second pattern PT2a and a third pattern PT3, and the second pattern PT2a and the third pattern PT3 may be disposed to contact the top surface of the coating layer CTL in the second portion B2a and the third part B3. As a plurality of second portions B2a and a plurality of third parts B3 are provided, a plurality of second patterns PT2a and a plurality of third patterns PT3 may be provided to correspond to the plurality of second portions B2a and the plurality of third parts B3.

The anti-fingerprint pattern layer APLa may be disposed on the lower-reflection pattern layer LRPLa. In detail, the anti-fingerprint pattern layer APLa may include first patterns PT1a and the anti-fingerprint layer AFL, and the anti-fingerprint layer AFL may be disposed on the lower-reflection pattern layer LRPLa. The first pattern PT1a may be disposed to contact the top surface of the coating layer CTL, in the first portion B1a. As a plurality of first portions B1a are provided, a plurality of first patterns PT1a may be provided to correspond to the plurality of first portions B1a.

A plurality of regions may be defined in the protective layer PLb. The plurality of regions may include the folding region FA2 and at least one non-folding region NFA3 or NFA4. The plurality of regions corresponds to the folding region FA2 and the non-folding region NFA3 or NFA4. The folding region FA2 is defined between two non-folding regions NFA3 and NFA4. The folding region FA2, which is a region folded about the second folding axis FX2, is a substantially curved region. The folding region FA2 is defined as a region folded in the second folding axis FX2 and extending in the first direction DR1.

The non-folding regions NFA3 and NFA4 may include the third non-folding region NFA3 and the fourth non-folding region NFA4. The third non-folding region NFA3 may be adjacent to one side of the folding region FA2 in the second direction DR2, and the fourth non-folding region NFA4 may be adjacent to an opposite side of the folding region FA2 in the second direction DR2.

According to an embodiment of the present disclosure, the first pattern PT1a and the second pattern PT2a may overlap the folding region FA2 when viewed in a plan view, and the third pattern PT3 may be in a non-overlap state with the folding region FA2 when viewed in a plan view. More specifically, the third pattern PT3 may overlap the non-folding regions NFA3 and NFA4, when viewed in a plan view. As the first pattern PT1a and the second pattern PT2a overlap the folding region FA2, when compared to the anti-fingerprint pattern layer APLa and the lower-reflection pattern layer LRPLa disposed in mutually different layers, stress may be prevented from being locally concentrated to the first pattern PT1a and the second pattern PT2a that overlap the folding region FA2, and the anti-fingerprint pattern layer APLa and the lower-reflection pattern layer LRPLa may be prevented from being broken by folding, even if the folding operation is performed repeatedly.

Figure 8A:
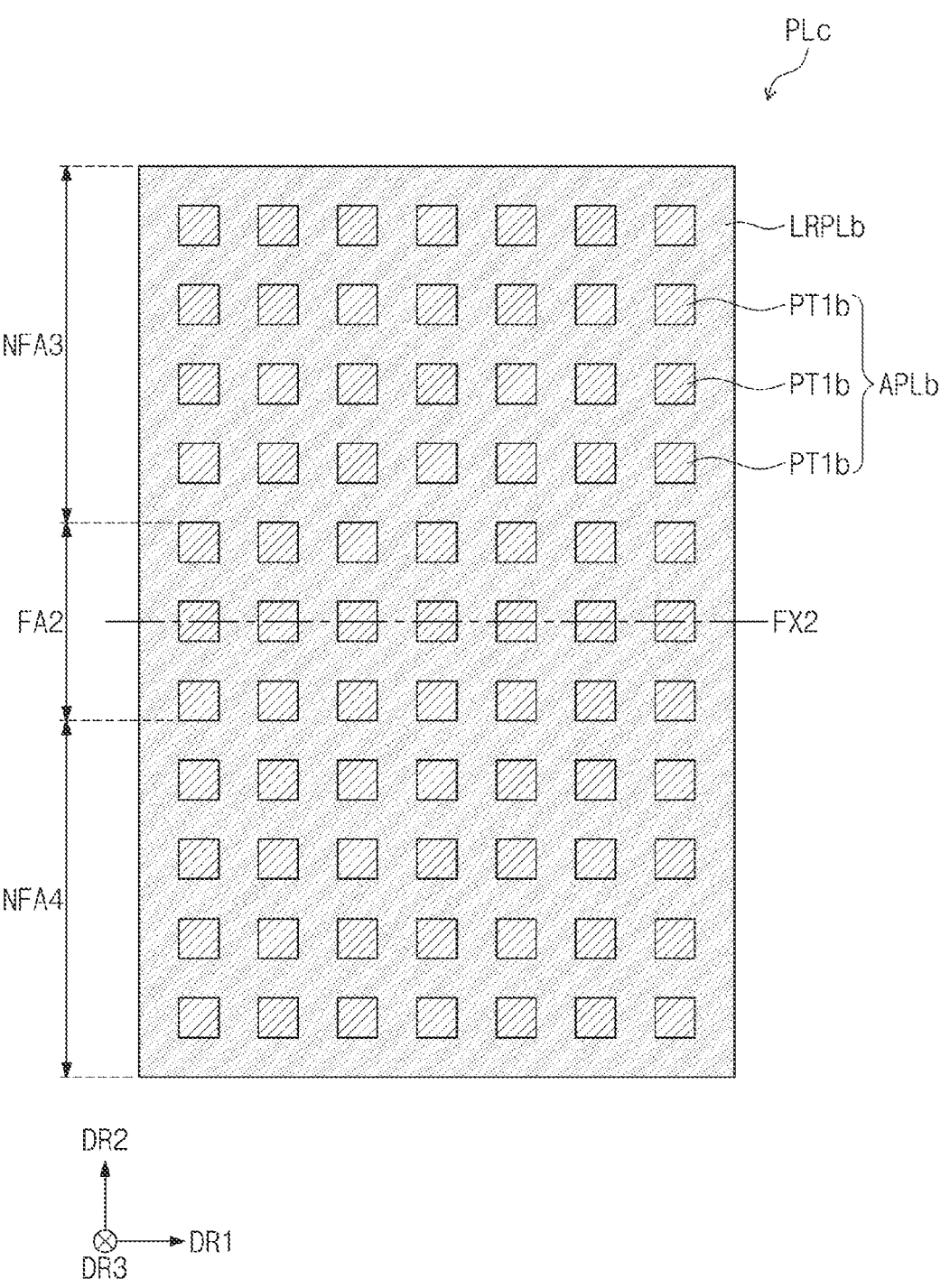
FIG. 8A is a plan view of a protective layer according to an embodiment of the present disclosure.
Figure 8B:
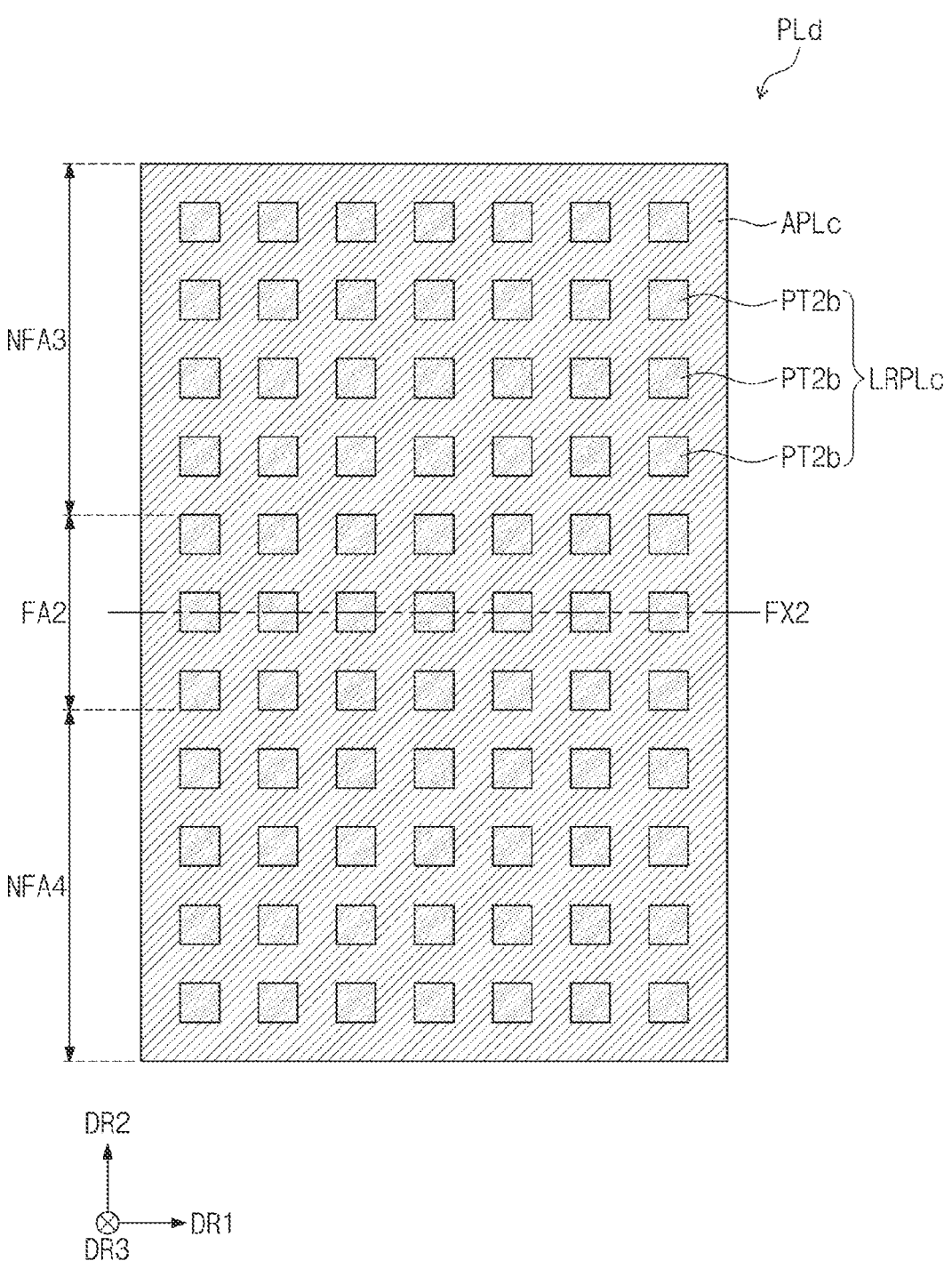
FIG. 8B is a plan view of a protective layer according to an embodiment of the present disclosure.

FIG. 8A is a plan view of a protective layer according to an embodiment of the present disclosure. FIG. 8B is a plan view of a protective layer according to an embodiment of the present disclosure.

Referring to FIGS. 6 and 8A, a protective layer PLc may include the base layer BS, the coating layer CTL, an anti-fingerprint pattern layer APLb, and a lower-reflection pattern layer LRPLb.

The anti-fingerprint pattern layer APLb may include a plurality of first patterns PT1b. The plurality of first patterns PT1b may be arranged in the first direction DR1 and the second direction DR2. The plurality of first patterns PT1b adjacent to each other may be spaced apart from each other by a specific distance in the first direction DR1 or the second direction DR2. The lower-reflection pattern layer LRPLb may be disposed in a region in which the anti-fingerprint pattern layer APLb is not disposed. In other words, the anti-fingerprint pattern layer APLb may have an island structure when viewed in a plan view. Each of the plurality of first patterns PT1b of the anti-fingerprint pattern layer APLb may be surrounded by the lower-reflection pattern layer LRPLb.

According to an embodiment of the present disclosure, the first pattern PT1b may overlap the folding region FA2 and the non-folding regions NFA3 and NFA4. However, the present disclosure is not limited thereto. For example, the first pattern PT1b may overlap only the folding region FA2. As the first pattern PT1b overlaps the folding region FA2, when compared to the anti-fingerprint pattern layer APLb and the lower-reflection pattern layer LRPLb disposed in mutually different layers, the stress may be prevented from being locally concentrated to the first pattern PT1b that overlaps the folding region FA2, and the anti-fingerprint pattern layer APLb and the lower-reflection pattern layer LRPLb may be prevented from being broken by folding repeated.

Referring to FIGS. 6 and 8B, a protective layer PLd may include the base layer BS, the coating layer CTL, an anti-fingerprint pattern layer APLc, and a lower-reflection pattern layer LRPLc.

The lower-reflection pattern layer LRPLc may include a plurality of second patterns PT2b. The plurality of second patterns PT2b may be arranged in the first direction DR1 and the second direction DR2. The plurality of second patterns PT2b adjacent to each other may be spaced apart from each other by a specific distance in the first direction DR1 or the second direction DR2. The anti-fingerprint pattern layer APLc may be disposed in the region in which the lower-reflection pattern layer LRPLc is not disposed. In other words, the lower-reflection pattern layer LRPLc may have an island structure when viewed in a plan view. Each of the plurality of second patterns PT2b of the lower-reflection pattern layer LRPLc may be surrounded by the anti-fingerprint pattern layer APLc.

According to an embodiment of the present disclosure, the second pattern PT2b may overlap the folding region FA2 and the non-folding regions NFA3 and NFA4. However, the present disclosure is not limited thereto. For example, the second pattern PT2b may overlap only the folding region FA2. As the second pattern PT2b overlaps the folding region FA2, when compared to the anti-fingerprint pattern layer APLc and the lower-reflection pattern layer LRPLc disposed in mutually different layers, the stress may be prevented from being locally concentrated to the second pattern PT2b that overlaps the folding region FA2, and the anti-fingerprint pattern layer APLc and the lower-reflection pattern layer LRPLc may be prevented from being broken by folding repeated.

Figure 8C:
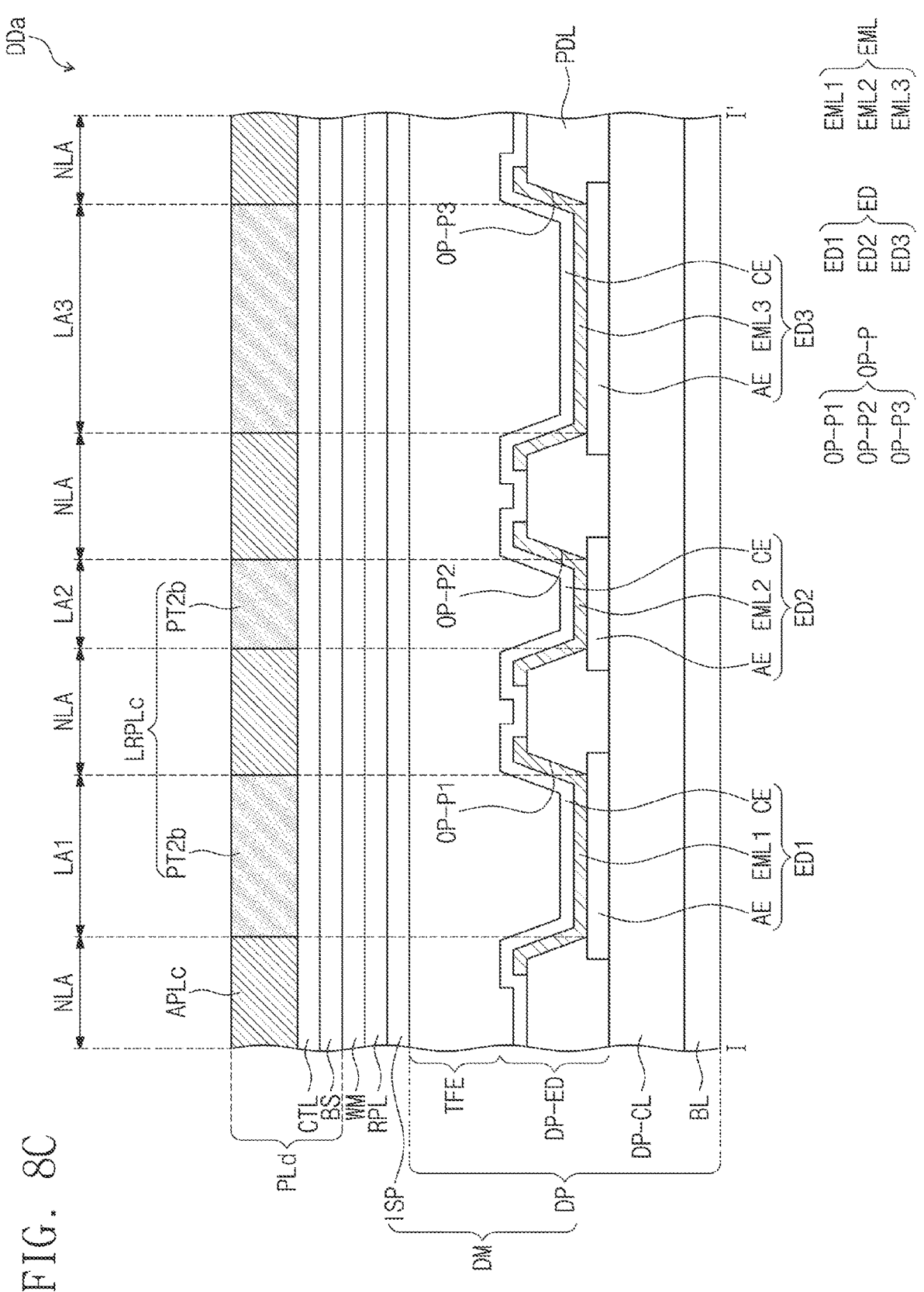
FIG. 8C is a cross-sectional view of a display device according to an embodiment of the present disclosure.

FIG. 8C is a cross-sectional view of a display device according to an embodiment of the present disclosure.

Referring to FIG. 8C, the display panel DP may include a base substrate BL, a circuit device layer DP-CL, a display device layer DP-ED, and an encapsulation layer TFE.

The base substrate BL may include or may be a synthetic resin film. In some embodiments, the base substrate BL may include or may be a glass substrate, a metal substrate, or an organic/inorganic composite material substrate.

The circuit device layer DP-CL may be disposed on the base substrate BL. The circuit device layer DP-CL may include a plurality of insulating layers, a semiconductor pattern, a conductive pattern, and a signal line. An insulating layer, a semiconductor layer, and a conductive layer are formed through coating and deposition schemes. Thereafter, the insulating layer, the semiconductor layer, and the conductive layer may be selectively patterned through photolithography and etching processes. In such a manner, the semiconductor pattern, the conductive pattern, and the signal line are formed to be included in the circuit device layer DP-CL and the display device layer DP-ED.

The display device layer DP-ED may be disposed on the circuit device layer DP-CL. According to the present embodiment, the display device layer DP-ED may include a light emitting device ED and a pixel defining layer PDL.

The light emitting device ED is disposed on the circuit device layer DP-CL. According to the present embodiment, the light emitting device ED may include a first light emitting device ED1, a second light emitting device ED2, and a third light emitting device ED3.

A first electrode AE is disposed on the insulating layer included in the circuit device layer DP-CL. A pixel opening OP-P is defined in the pixel defining layer PDL. The pixel opening OP-P exposes at least a portion of the first electrode AE. Substantially, a light emitting region LA may be defined to correspond to a portion, which is exposed through the pixel opening OP-P, of the first electrode AE. A non-light emitting region NLA corresponds to a remaining region except for the light emitting region LA.

According to an embodiment, the pixel defining layer PDL may include a light absorbing material. The pixel defining layer PDL may include a black coloring agent. The black coloring agent may include a black dye and a black pigment. The black coloring agent may include carbon black, metal, such as chromium, or oxides thereof.

A light emitting layer EML may be disposed on the first electrode AE. The light emitting layer EML may be disposed in a region corresponding to the pixel opening OP-P. In other words, the light emitting layer EML may be disposed to correspond to the light emitting region LA.

A second electrode CE is disposed on the light emitting layer EML. The second electrode CE may be disposed in the light emitting region LA and the non-light emitting region NLA, in common. Although not illustrated, the light emitting device ED may include a hole control layer and an electron control layer.

The encapsulation layer TFE is disposed on the light emitting device ED. The encapsulation layer TFE may be a thin film encapsulation layer. The encapsulation layer TFE may be one layer or a plurality of layers stacked. The encapsulation layer TFE includes at least one organic layer.

The pixel defining layer PDL may include a plurality of pixel openings OP-P. The pixel openings OP-P may include a first pixel opening OP-P1, a second pixel opening OP-P2, and a third pixel opening OP-P3 having different areas when viewed in a plan view. According to an embodiment of the present disclosure, a plurality of light emitting devices ED may be provided and may include a first light emitting device ED1, a second light emitting device ED2, and a third light emitting device ED3. The first light emitting device ED1 may include a first electrode AE exposed through the first pixel opening OP-P1, a first light emitting layer EML1 providing first color light, and a second electrode CE. The first electrode AE included in the first light emitting device ED1 may be exposed through the first pixel opening OP-P1 to define a first light emitting region LA1.

The second light emitting device ED2 may include a first electrode AE exposed through the second pixel opening OP-P2, a second light emitting layer EML2 providing second color light, and a second electrode CE. The first electrode AE included in the second light emitting device ED2 may be exposed through the second pixel opening OP-P2 to define a second light emitting region LA2.

The third light emitting device ED3 may include a first electrode AE exposed through the third pixel opening OP-P3, a second light emitting layer EML3 providing third color light, and a second electrode CE. The first electrode AE included in the third light emitting device ED3 may be exposed through the third pixel opening OP-P3 to define a third light emitting region LA3.

As illustrated in FIG. 8C, a display device DDa may include the protective layer PLd provided on the window WM, and the protective layer PLd may include the base layer BS, the coating layer CTL, the anti-fingerprint pattern layer APLc, and the lower-reflection pattern layer LRPLc. The lower-reflection pattern layer LRPLc may include the plurality of second patterns PT2b, and the plurality of second patterns PT2b may overlap the plurality of pixel openings OP-P. The size and the shape of each of the plurality of second patterns PT2b may correspond to the size and the shape of each of the plurality of pixel openings OP-P. In other words, the plurality of second patterns PT2b may overlap the first light emitting region LA1, the second light emitting region LA2, and the third light emitting region LA3, when viewed in a plan view. The lower-reflection pattern layer LRPLc may increase screen visibility for a user by reducing the surface reflection index of the external light. According to an embodiment, as the lower-reflection pattern layer LRPLc overlaps regions where the pixel openings OP-P are formed, the lower-reflection pattern layer LRPLc may reduce the reflection index of the external light in the overlap region with the pixel openings OP-P. Accordingly, the visibility of the screen may be improved.

Hereinafter, a method of manufacturing a display device according to an embodiment of the present disclosure will be described with reference to FIGS. 9A to 9E, and FIGS. 10A to 10D. According to an embodiment of the present disclosure, in the following description on the method of manufacturing the display device, the above-description on the display device will be employed. Hereinafter, the following description on the method of manufacturing the display device will be made while focusing on the difference from the above-description, and the repeated descriptions of the display device according to an embodiment will be omitted.

FIGS. 9A to 9E are cross-sectional views illustrating some steps in the manufacturing process of the display device according to an embodiment of the present disclosure. In detail, the method of manufacturing the protective layer PL (see FIG. 5) according to an embodiment of the present disclosure will be described with reference to FIGS. 9A to 9E.

Figure 9A:
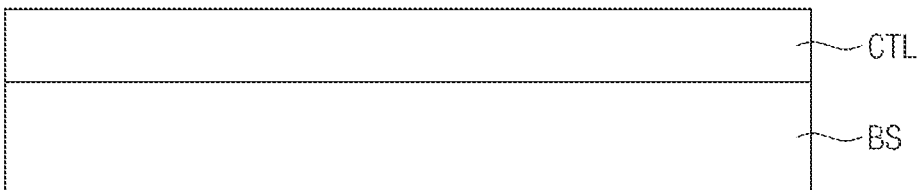
FIGS. 9A to 9E are cross-sectional views illustrating some steps in the manufacturing process of the display device according to an embodiment of the present disclosure.

FIG. 9A may illustrates a step of forming the base layer BS and the coating layer CTL. In addition, the method may further include the steps of manufacturing the display module DM and the window WM serving as some components of the display device DD (see FIG. 4), before the step of forming the base layer BS and the coating layer CTL.

Figure 9B:
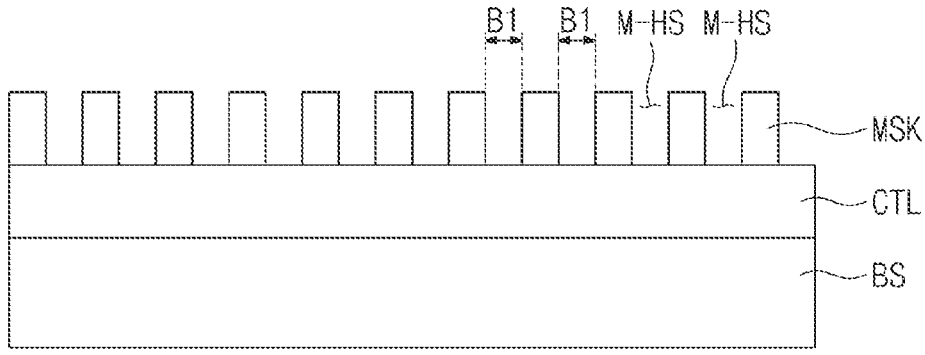
Figure 9C:
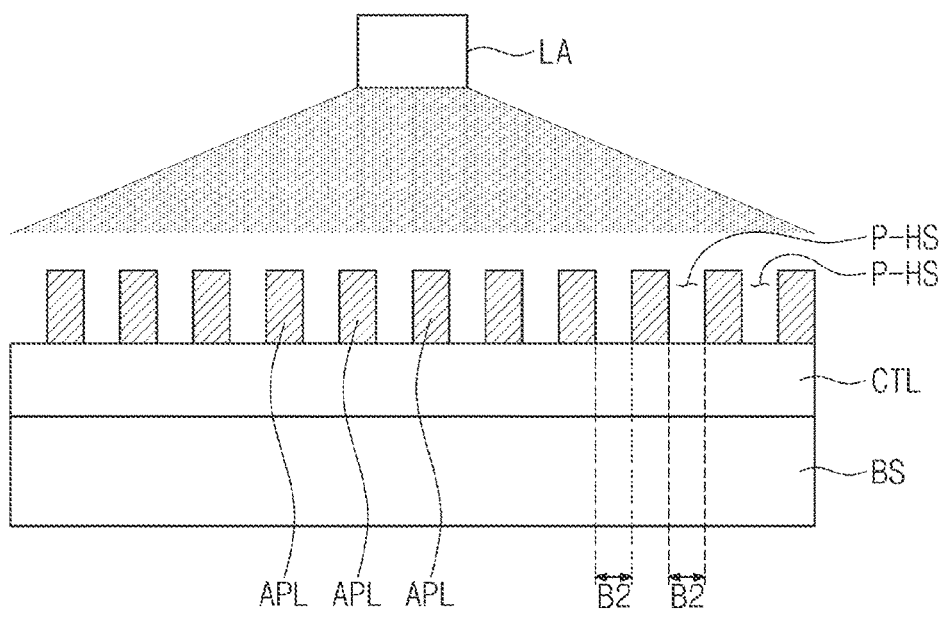

FIGS. 9B and 9C are cross-sectional views illustrating the step of forming the anti-fingerprint pattern layer APL on the coating layer CTL. The step of forming the anti-fingerprint pattern layer APL may include the steps of disposing, on the coating layer CTL, a mask MSK having a plurality of mask holes M-HS defined therein, and forming the anti-fingerprint pattern layer APL on the coating layer CTL by using the mask MSK.

The mask MSK may be disposed to overlap the second portion B2 of the coating layer CTL. Although not illustrated, the mask MSK may be in the shape having a plurality of lines or a plurality of openings, when viewed in a plan view. The mask MSK may include a plastic film, a polymer layer, a photoresist, or a stainless steel. The anti-fingerprint pattern layer APL may be formed through the plurality of mask holes M-HS formed in the mask MSK. Specifically, the anti-fingerprint pattern layer APL may be formed by coating an anti-fingerprint material in a plurality of mask holes M-HS formed in the mask MSK and by curing the anti-fingerprint material. The coating scheme may be any one of a wet coating scheme, a dry coating scheme, or an ink-jet coating scheme. In other words, the anti-fingerprint pattern layer APL may be formed by thermosetting or photocuring an anti-fingerprint material. According to an embodiment of the present disclosure, the anti-fingerprint pattern layer APL may be formed by photocuring the anti-fingerprint material using light irradiated through a light source LA positioned above the mask MSK. The anti-fingerprint pattern layer APL may improve contamination resistance of the coating layer CTL by including the anti-fingerprint material. As illustrated in FIG. 9C, after the anti-fingerprint pattern layer APL is formed, the mask MSK may be removed. The anti-fingerprint pattern layer APL may include a plurality of pattern holes P-HS.

Figure 9D:
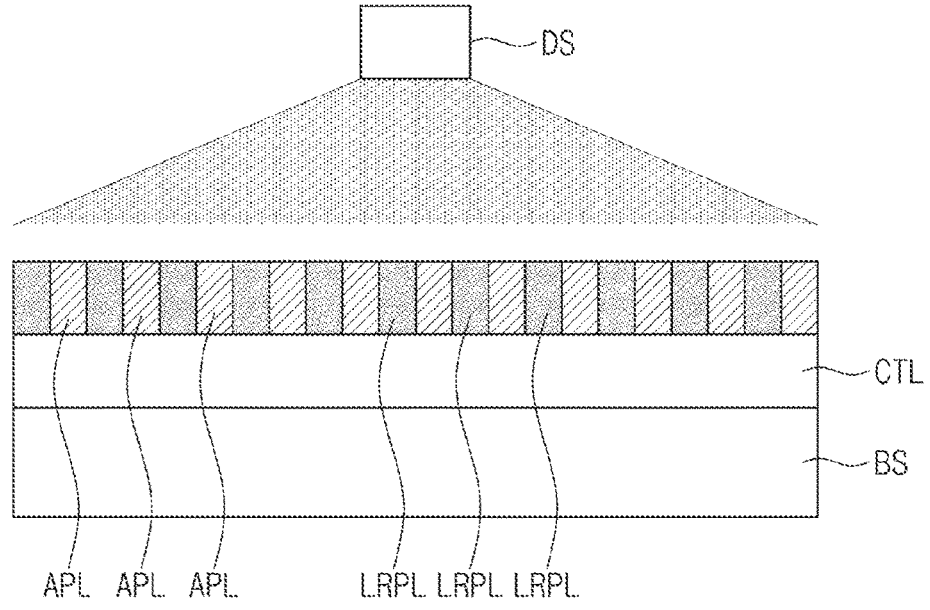
Figure 9E:
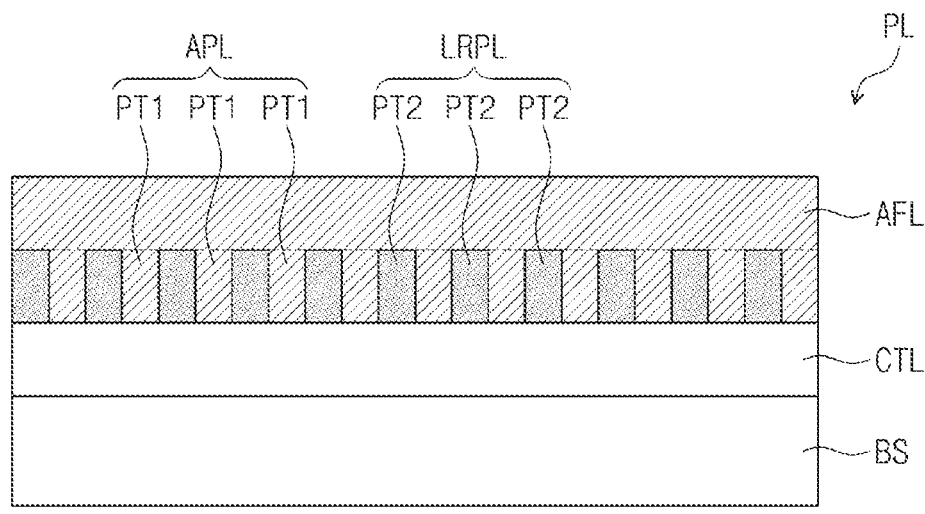

FIG. 9D illustrates a step of forming a lower-reflection pattern layer LRPL in a region from which a mask MSK (see FIG. 9B) is removed to form the plurality of pattern holes P-HS (see FIG. 9C) among the plurality of first patterns PT1 (see FIG. 9E).

Referring to FIGS. 9C and 9D, the coating layer CTL may include the second portion B2. Specifically, the second portion B2 may be a region in which the mask MSK is removed and the lower-reflection pattern layer LRPL is formed on the resultant structure. The lower-reflection pattern layer LRPL may be formed on the second portion B2. Specifically, the anti-fingerprint pattern layer APL may serve as a mask, and the lower-reflection pattern layer LRPL may be formed on the second portion B2.

The lower-reflection pattern layer LRPL may be formed through a deposition scheme, such as a sputtering process (e.g., a reactive ion sputtering process) and an electron beam evaporation scheme. According to an embodiment of the present disclosure, the lower-reflection pattern layer LRPL may be formed through the sputtering process. In other words, the lower-reflection pattern layer LRPL may be formed through a deposition device DS disposed on the mask MSK. For example, when the lower-reflection pattern layer LRPL includes $SiO_2$, Ar gas and $O_2$ gas are simultaneously injected at an appropriate ratio, and the Si target is subject to a sputtering process. Accordingly, Si makes a reaction with $O_2$ to deposit a $SiO_2$ thin film for the lower-reflection pattern layer LRPL. According to an embodiment of the present disclosure, the lower-reflection pattern layer LRPL may increase screen visibility for a user by reducing the surface reflection index of the external light.

As the anti-fingerprint pattern layer APL and the lower-reflection pattern layer LRPL are formed on the coating layer CTL while alternately contacting each other, when compared to the anti-fingerprint pattern layer APL and the lower-reflection pattern layer LRPL disposed in mutually different layers, compressive force and tensile stress force applied to the anti-fingerprint pattern layer APL and the lower-reflection pattern layer LRPL are dispersed, thereby preventing the anti-fingerprint pattern layer APL and the lower-reflection pattern layer LRPL from being broken by folding. In addition, as the anti-fingerprint pattern layer APL is bonded (provided or formed) with the coating layer CTL while directly contacting the top surface of the coating layer CTL, the protective layer PL may exhibit an improved abrasion resistance due to the increased coupling force between the anti-fingerprint pattern layer APL and the coating layer CTL.

Referring to FIG. 9E, the step of forming the anti-fingerprint layer AFL on the anti-fingerprint pattern layer APL and the lower-reflection pattern layer LRPL may be further performed, after forming the lower-reflection pattern layer LRPL. In detail, the anti-fingerprint layer AFL may be directly disposed on the anti-fingerprint pattern layer APL and the lower-reflection pattern layer LRPL through a coating scheme. For example, the coating scheme may be any one of a wet coating scheme, a dry coating scheme, or an ink-jet coating scheme. The anti-fingerprint layer AFL may include or may be formed of a material that is the same as a material of the anti-fingerprint pattern layer APL. Accordingly, the anti-fingerprint layer AFL may be formed by thermosetting or photocuring the anti-fingerprint material.

The anti-fingerprint layer AFL may be directly disposed on the anti-fingerprint pattern layer APL and integrally connected to the anti-fingerprint pattern layer APL. The anti-fingerprint layer AFL is disposed on the anti-fingerprint pattern layer APL and the lower-reflection pattern layer LRPL, thereby improving the slip properties and scratch resistance of the surfaces of the anti-fingerprint pattern layer APL and the lower-reflection pattern layer LRPL.

Although not illustrated, the step of performing etching or plasma-treatment for the anti-fingerprint layer AFL may be further included, after forming the anti-fingerprint layer AFL. In detail, the method may further include the step of etching a region having a step present in the anti-fingerprint layer AFL by using an etching solution, such as a strong acid solution and a strong base solution, to planarize the anti-fingerprint layer AFL. Alternatively, a planarization work of the anti-fingerprint layer AFL may be performed by using plasma gas such as hydrogen fluoride.

FIGS. 10A to 10D are cross-sectional views illustrating some steps in the manufacturing process of the display device according to an embodiment of the present disclosure. In detail, FIGS. 10A to 10D are cross-sectional views illustrating the method of manufacturing the protective layer PLa (see FIG. 10D), according to an embodiment of the present disclosure.

Figure 10A:
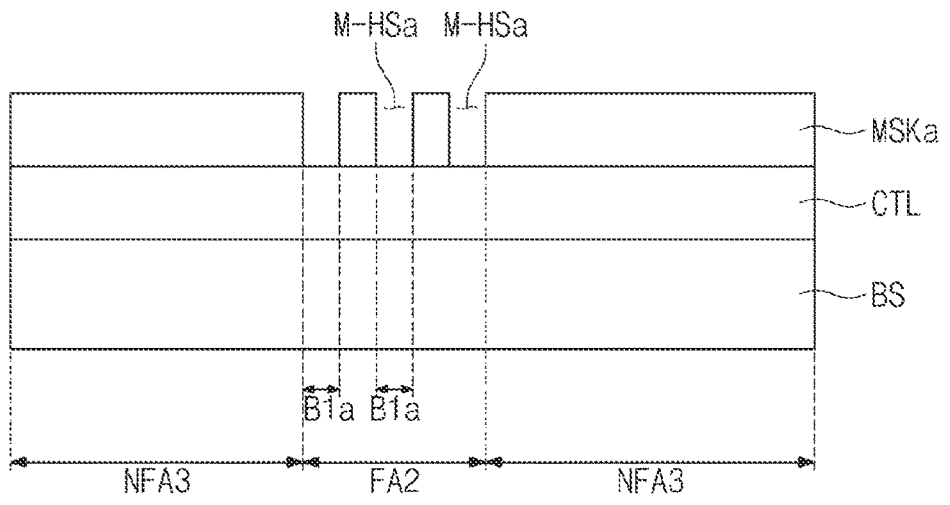
FIGS. 10A to 10D are cross-sectional views illustrating some steps in the manufacturing process of the display device according to an embodiment of the present disclosure.
Figure 10B:
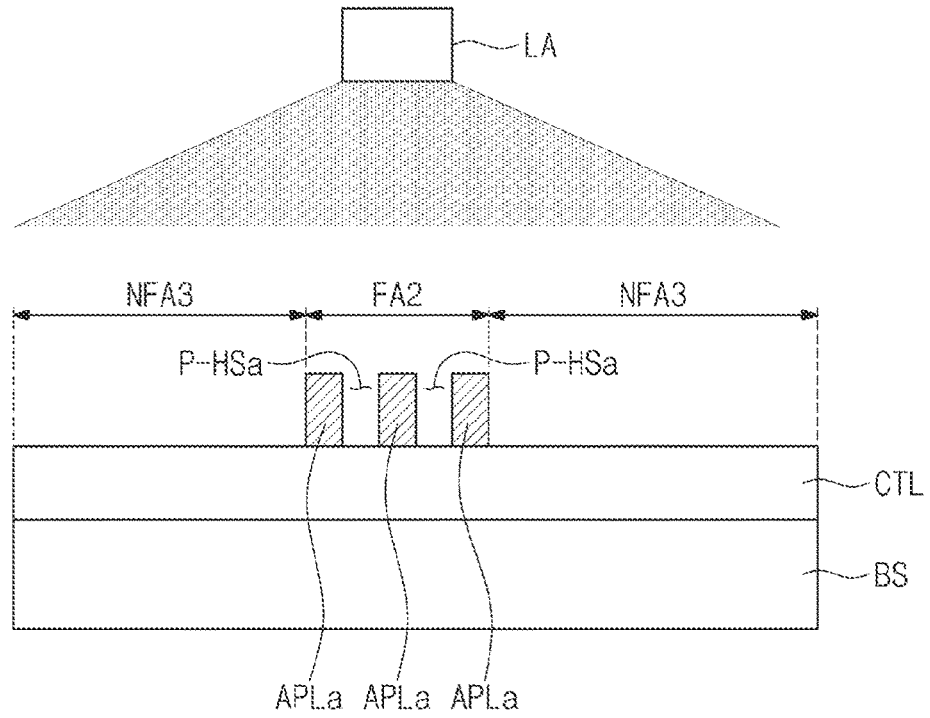

FIGS. 10A and 10B are cross-sectional views illustrating the step of forming the anti-fingerprint pattern layer APLa on the coating layer CTL. The step of forming the anti-fingerprint pattern layer APLa may include the steps of disposing, on the coating layer CTL, a mask MSKa having a plurality of mask holes M-HSa defined therein, and forming the anti-fingerprint pattern layer APLa on the coating layer CTL by using the mask MSKa.

The mask MSKa may overlap the coating layer CTL. Although not illustrated, the mask MSKa may be in the shape having a plurality of lines or a plurality of dots, when viewed in a plan view. The mask MSKa may include or may be formed of a plastic film, a polymer layer, a photoresist, or a stainless steel. The anti-fingerprint pattern layer APLa may be formed through the plurality of mask holes M-HSa formed in the mask MSKa. According to an embodiment of the present disclosure, the plurality of mask-holes M-HSa may overlap the folding region FA2, when viewed in a plan view. The anti-fingerprint pattern layer APLa may be formed through the plurality of mask holes M-HSa. Since the first portion B1a is a region for the anti-fingerprint pattern layer APLa, the first portion B1a may overlap the folding region FA2.

The anti-fingerprint pattern layer APLa may be provided on the first portion B1a of the coating layer CTL through a scheme such as coating an anti-fingerprint material through the plurality of mask holes M-HSa formed in the mask MSKa and curing the anti-fingerprint material. The coating scheme may be any one of a wet coating scheme, a dry coating scheme, or an ink-jet coating scheme. In other words, the anti-fingerprint pattern layer APLa may be formed by thermosetting or photocuring the anti-fingerprint material. According to an embodiment of the present disclosure, the anti-fingerprint pattern layer APLa may be formed by photocuring the anti-fingerprint material using light provided through the light source LA positioned above the mask MSKa. The light source LA is to form the anti-fingerprint pattern layer APLa by irradiating light to the folding region FA2. The anti-fingerprint pattern layer APLa may improve contamination resistance of the coating layer CTL by including the anti-fingerprint material. The anti-fingerprint pattern layer APLa may include a plurality of pattern holes P-HSa.

Figure 10C:
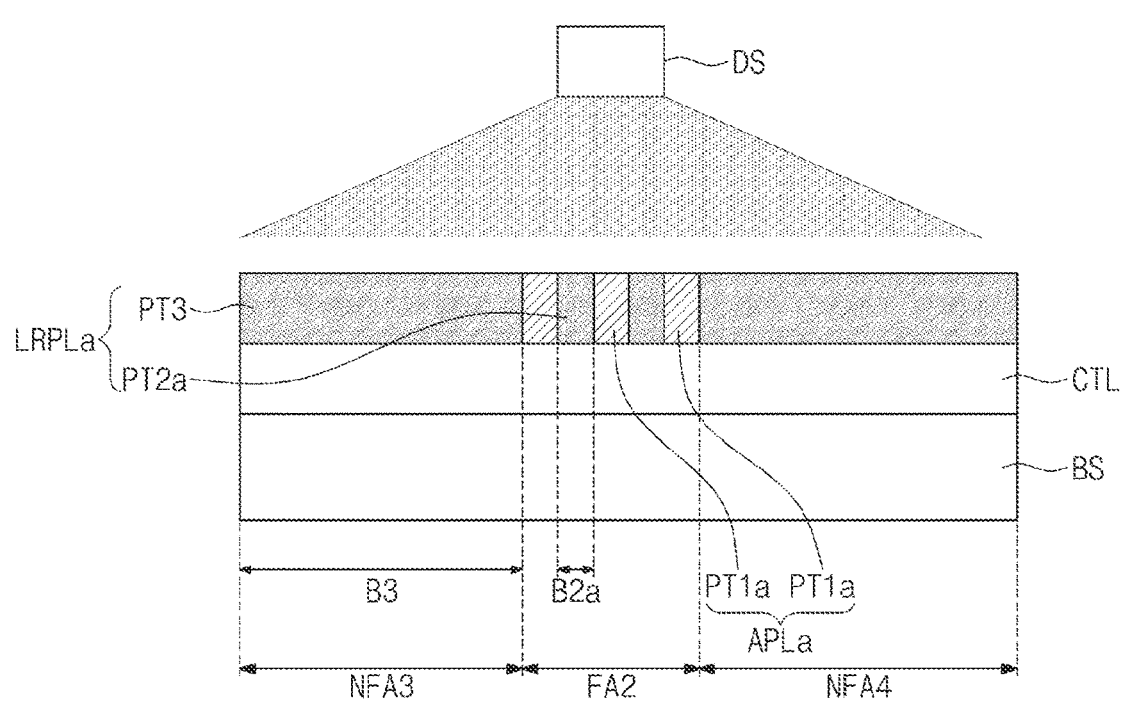

FIGS. 10B and 10C are cross-sectional views illustrating the step of forming the lower-reflection pattern layer LRPLa on the coating layer CTL. In detail, FIG. 10B illustrates the step of removing the mask MSKa (see FIG. 10A) after forming the anti-fingerprint pattern layer APLa, and FIG. 10C illustrates the step of forming the lower-reflection pattern layer LRPLa in a region obtained after the mask MSKa is removed. The anti-fingerprint pattern layer APLa illustrated in FIG. 10B includes a plurality of first patterns PT1a, and the plurality of first patterns PT1a correspond to the first pattern PT1a illustrated in FIG. 7B.

Referring to FIGS. 10B and 10C, the coating layer CTL may include the second portion B2a and the third part B3. Specifically, the second portion B2a may be a region in which the mask MSK is removed and the lower-reflection pattern layer LRPL is formed on the resultant structure. The lower-reflection pattern layer LRPLa may include the second pattern PT2a and the third pattern PT3. The second pattern PT2a may be formed on the second portion B2a, and the third pattern PT3 may be included on the third part B3. Specifically, the anti-fingerprint pattern layer APLa serves as a mask, and the lower-reflection pattern layer LRPL may be formed on the second portion B2a and the third part B3, which are regions formed by the anti-fingerprint pattern layer APLa.

The lower-reflection pattern layer LRPLa may be formed through a deposition scheme, such as a sputtering scheme and an electron-beam evaporation scheme. According to an embodiment of the present disclosure, the lower-reflection pattern layer LRPLa may be formed through the sputtering process. In other words, the lower-reflection pattern layer LRPLa may be formed through the deposition device DS disposed on the mask MSKa. For example, when the lower-reflection pattern layer LRPLa includes $SiO2$, Ar gas and $O_2$ gas are simultaneously injected at an appropriate ratio, and the Si target is subject to a sputtering process. Accordingly, Si makes a reaction with $O_2$ to deposit a $SiO_2$ thin film for the lower-reflection pattern layer LRPLa. The lower-reflection pattern layer LRPLa may increase screen visibility for a user by reducing the surface reflection index of the external light.

The lower-reflection pattern layer LRPLa may include the second pattern PT2a formed in the overlap region with the folding region FA2. A plurality of second patterns PT2a illustrated in FIG. 10C corresponds to the second pattern PT2a illustrated in FIG. 7B. As the anti-fingerprint pattern layer APLa and the second pattern PT2a are formed on the coating layer CTL in the folding region FA2 while alternately contacting each other, when compared to the lower-reflection pattern layer LRPLa and the anti-fingerprint pattern layer APLa disposed in mutually different layers, stress may be prevented from being locally concentrated to the anti-fingerprint pattern layer APLa and the second pattern PT2 that overlap the folding region FA2, thereby preventing the anti-fingerprint pattern layer APLa and the lower-reflection pattern layer LRPLa from being broken by folding.

Figure 10D:
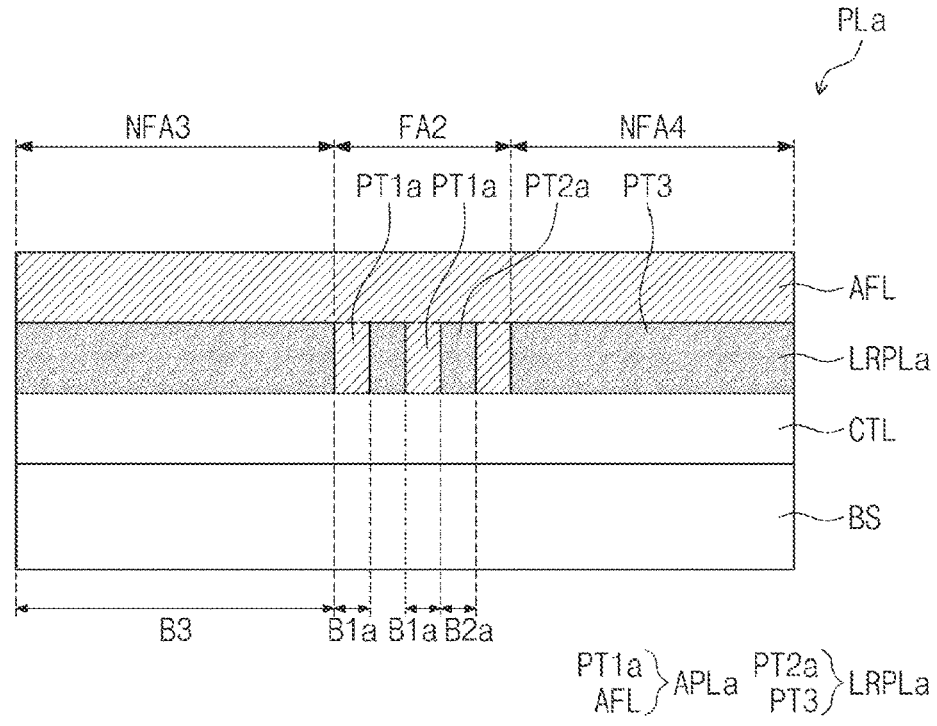

Referring to FIG. 10D, the step of forming the anti-fingerprint layer AFL on the anti-fingerprint pattern layer APLa and the lower-reflection pattern layer LRPLa may be further performed, after forming the lower-reflection pattern layer LRPLa. The anti-fingerprint layer AFL may include or may be formed of a material the same as a material of the anti-fingerprint pattern layer APL. Accordingly, the anti-fingerprint layer AFL may be formed by thermosetting or photocuring the anti-fingerprint material.

The anti-fingerprint layer AFL may be directly disposed on the anti-fingerprint pattern layer APLa and integrally connected to the anti-fingerprint pattern layer APLa. According to an embodiment of the present disclosure, the anti-fingerprint pattern layer APLa may include the first pattern PT1a and the anti-fingerprint pattern layer APL. The anti-fingerprint layer AFL is disposed on the first pattern PT1a and the lower-reflection pattern layer LRPLa, thereby improving the slip properties and scratch resistance of the surfaces of the first pattern PT1a and the lower-reflection pattern layer LRPLa.

As the lower-reflection pattern layer and the anti-fingerprint pattern layer are formed while alternately contacting each other, the compressive force and the tensile stress force applied to the anti-fingerprint pattern layer and the lower-reflection pattern layer are dispersed, thereby preventing the anti-fingerprint pattern layer and the lower-reflection pattern layer from being broken by folding.

As the anti-fingerprint pattern layer is coupled to the top surface of the coating layer to directly contact the top surface of the coating layer, the protective layer may have an improved anti-abrasive characteristic due to the increase in the coupling force between the anti-fingerprint pattern layer and the coating layer.

Although an embodiment of the present disclosure has been described for illustrative purposes, those skilled in the art will appreciate that various modifications, and substitutions are possible, without departing from the scope and spirit of the invention as disclosed in the accompanying claims.

Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A display device comprising:
a display module;
a window disposed on the display module; and
a protective layer disposed on the window, wherein the protective layer includes:
   a coating layer;
   an anti-fingerprint pattern layer disposed on a first portion of the coating layer; and
   a lower-reflection pattern layer disposed on a second portion of the coating layer, wherein the anti-fingerprint pattern layer includes a plurality of first patterns, and wherein the lower-reflection pattern layer includes a plurality of second patterns.

2. The display device of claim 1,
wherein the plurality of first patterns of the anti-fingerprint pattern layer extend in a first direction,
wherein the plurality of second patterns of the lower-reflection pattern layer extend in the first direction, and
wherein each of the plurality of first patterns and each of the plurality of second patterns are alternately arranged in a second direction different from the first direction.

3. The display device of claim 2,
wherein each of the plurality of first patterns has a first width in the second direction,
wherein each of the plurality of second patterns has a second width in the second direction, and
wherein the second width is equal to the first width.

4. The display device of claim 2,
wherein each of the plurality of first patterns contacts sidewalls of two corresponding second patterns of the plurality of second patterns.

5. The display device of claim 4,
wherein a distance, in the second direction, between a center of one of the plurality of first patterns and a center of one of the plurality of second patterns is about 10 μm or less, and
wherein the one of the plurality of first patterns contacts the one of the plurality of second patterns.

6. The display device of claim 1,
wherein the protective layer further includes:
an anti-fingerprint layer disposed on the anti-fingerprint pattern layer and the lower-reflection pattern layer.

7. The display device of claim 6,
wherein the anti-fingerprint layer overlaps the lower-reflection pattern layer and the anti-fingerprint pattern layer, and is formed integrally with the anti-fingerprint pattern layer.

8. The display device of claim 1,
wherein the protective layer further includes a base layer disposed under the coating layer.

9. The display device of claim 1,
wherein the protective layer has a folding region folded about a virtual folding axis and a non-folding region, which is not folded about the virtual folding axis.

10. A display device comprising:
a display module has a folding region folded about a virtual folding axis and a non-folding region in a flat state not folded about the virtual folding axis;
a window disposed on the display module; and
a protective layer disposed on the window,
wherein the protective layer includes:
   a coating layer;
   a lower-reflection pattern layer disposed on the coating layer, the lower-reflection pattern including a plurality of openings exposing the coating layer; and
   an anti-fingerprint pattern layer disposed on the lower-reflection pattern layer and disposed on the coating layer, through the plurality of openings, wherein the anti-fingerprint pattern layer includes:
   a first pattern disposed on a first portion of the coating layer; and
wherein the lower-reflection pattern layer includes:
   a second pattern disposed on a second portion of the coating layer.

11. The display device of claim 10,
wherein the first pattern and the second pattern have the same width.

12. The display device of claim 10,
wherein the first pattern is provided in plural,
wherein the second pattern is provided in plural, and
wherein each of the plurality of second patterns and each of the plurality of first patterns are alternately arranged.

13. The display device of claim 12,
wherein each of the plurality of first patterns and each of the plurality of second patterns alternately contact with each other.

14. The display device of claim 12,
wherein a distance between a center of one of the plurality of first patterns and a center of one of the plurality of second patterns is about 10 μm or less, and
wherein the one of the plurality of first patterns contacts the one of the plurality of second patterns.

15. The display device of claim 10,
wherein the first pattern and the second pattern overlap the folding region, when viewed in a plan view.

16. An electronic device comprising:
a display device comprising:
   a display module;
   a window disposed on the display module;
   and a protective layer disposed on the window,
wherein the protective layer includes:
   a coating layer;
   an anti-fingerprint pattern layer disposed on a first portion of the coating layer; and
   a lower-reflection pattern layer disposed on a second portion of the coating layer,
   wherein the anti-fingerprint pattern layer includes a plurality of first patterns, and wherein the lower-reflection pattern layer includes a plurality of second patterns.

17. The electronic device of claim 16,
wherein the plurality of first patterns of the anti-fingerprint pattern layer extend in a first direction,
wherein the plurality of second patterns of the lower-reflection pattern layer extend in the first direction, and
wherein each of the plurality of first patterns and each of the plurality of second patterns are alternately arranged in a second direction different from the first direction.

18. The electronic device of claim 17,
wherein each of the plurality of first patterns has a first width in the second direction,
wherein each of the plurality of second patterns has a second width in the second direction, and
wherein the second width is equal to the first width.

19. The electronic device of claim 17,
wherein each of the plurality of first patterns contacts sidewalls of two corresponding second patterns of the plurality of second patterns,
wherein a distance, in the second direction, between a center of one of the plurality of first patterns and a center of one of the plurality of second patterns is about 10 μm or less, and
wherein the one of the plurality of first patterns contacts the one of the plurality of second patterns.

20. The electronic device of claim 16, wherein the protective layer further includes:

an anti-fingerprint layer disposed on the anti-fingerprint pattern layer and the lower-reflection pattern layer, and wherein the anti-fingerprint layer overlaps the lower-reflection pattern layer and the anti-fingerprint pattern layer, and is formed integrally with the anti-fingerprint pattern layer.

* * * * *